US010783901B2

(12) United States Patent
Newell et al.

(10) Patent No.: US 10,783,901 B2
(45) Date of Patent: Sep. 22, 2020

(54) ALTERNATE RESPONSE GENERATION

(71) Applicant: Amazon Technologies, Inc., Seattle, WA (US)

(72) Inventors: Gregory Newell, Waltham, MA (US); Eliav Kahan, Jamaica Plain, MA (US); Ravi Chandra Reddy Yasa, Ashland, MA (US); David Suarez, Cambridge, MA (US); Joel Toledano, Boston, MA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 76 days.

(21) Appl. No.: 16/214,758

(22) Filed: Dec. 10, 2018

(65) Prior Publication Data

US 2020/0184992 A1    Jun. 11, 2020

(51) Int. Cl.
*G06F 15/00*    (2006.01)
*G10L 15/00*    (2013.01)
(Continued)

(52) U.S. Cl.
CPC .......... *G10L 25/51* (2013.01); *G10L 15/1822* (2013.01); *G10L 15/22* (2013.01);
(Continued)

(58) Field of Classification Search
CPC ..... G10L 15/1822; G10L 15/22; G10L 15/26; G10L 25/51; G10L 2015/223; G10L 2015/225
(Continued)

(56) References Cited

U.S. PATENT DOCUMENTS 6,507,643 B1 *    1/2003    Groner ................ H04M 3/5307
                                                 379/88.14
6,885,990 B1 *    4/2005    Ohmori .................. G10L 15/22
                                                 704/270
(Continued)

FOREIGN PATENT DOCUMENTS

WO    02073331 A2    9/2002

OTHER PUBLICATIONS

International Search Report and Written Opinion dated Mar. 3, 2020 in International Patent Application No. PCT/US2019/065124.

*Primary Examiner* — Khai N. Nguyen
(74) *Attorney, Agent, or Firm* — Pierce Atwood LLP

(57) ABSTRACT

Techniques for performing conversation recovery of a system/user exchange are described. In response to determining that an action responsive to a user input cannot be performed, a system may determine a topic to recommend to a user. The topic may be unrelated to the original substance of the user input. The system may have access to various data representing a context in which a user provides an input to the system. The system may use these inputs and various data at runtime to make a determination regarding whether a user should be recommended a topic, as well as what that topic should be. The system may cause a question be output to the user, with the question asking the user about the topic, for example whether the user would like a song played, whether the user would like to hear information about a particular individual (e.g., artist), whether the user would like to know about a particular skill (e.g., a skill having a significantly high popularity among users of the system), or whether the user would like to know about some other topic. If the user responds affirmatively to the recommended topic, the system may pass the user experience off to an appropriate component of the system (e.g., one that is configured to perform an action related to the topic). If the user responds (Continued)

negatively, does not respond at all, or the system is unsure whether the user's response was affirmative or negative, the system may cease interaction with the user, thereby enabling the user to interact with the system as the user desires.

20 Claims, 15 Drawing Sheets

(51) Int. Cl.
- *G10L 17/00* (2013.01)
- *G10L 25/51* (2013.01)
- *G10L 15/18* (2013.01)
- *G10L 15/22* (2006.01)
- *G10L 15/26* (2006.01)

(52) U.S. Cl.
CPC ........ *G10L 15/26* (2013.01); *G10L 2015/223* (2013.01); *G10L 2015/225* (2013.01)

(58) Field of Classification Search
USPC .......................................................... 704/200
See application file for complete search history.

(56) References Cited

U.S. PATENT DOCUMENTS

| | | | | |
|---|---|---|---|---|
| 7,286,988 B2* | 10/2007 | Ohmori | ................... | G10L 15/22 704/270 |
| 7,676,754 B2* | 3/2010 | Basson | ................... | G06F 3/012 715/760 |
| 7,918,666 B1* | 4/2011 | Lewolt | ................... | G09B 5/02 434/322 |
| 8,140,330 B2* | 3/2012 | Cevik | ................... | G10L 15/22 704/238 |
| 8,185,400 B1* | 5/2012 | Goffin | ................... | G10L 15/22 704/233 |
| 8,532,995 B2* | 9/2013 | Goffin | ................... | G10L 15/22 704/233 |
| 8,954,326 B2* | 2/2015 | Kwak | ................... | G10L 15/22 704/246 |
| 10,079,021 B1 | 9/2018 | Barra Chicote et al. | | |
| 10,083,002 B2* | 9/2018 | Clark | ................... | H04W 4/16 |
| 2001/0021909 A1 | 9/2001 | Shimomura et al. | | |
| 2004/0015365 A1* | 1/2004 | Ohmori | ................... | G10L 15/22 704/276 |
| 2005/0144187 A1* | 6/2005 | Che | ................... | G10L 15/26 |
| 2005/0251746 A1* | 11/2005 | Basson | ............... | G06F 3/04883 715/708 |
| 2009/0313016 A1* | 12/2009 | Cevik | ................... | G10L 15/22 704/241 |
| 2011/0022389 A1* | 1/2011 | Kim | ................... | G10L 15/07 704/246 |
| 2012/0173244 A1* | 7/2012 | Kwak | ................... | G10L 15/22 704/275 |
| 2012/0232892 A1* | 9/2012 | Goffin | ................... | G10L 15/22 704/231 |
| 2015/0363481 A1* | 12/2015 | Haynes | ................ | G06Q 10/10 707/748 |
| 2016/0155445 A1 | 6/2016 | Selfridge et al. | | |
| 2017/0076626 A1* | 3/2017 | Lam | ................... | G09B 17/003 |
| 2017/0345426 A1* | 11/2017 | Komissarchik | ......... | G10L 15/07 |

* cited by examiner

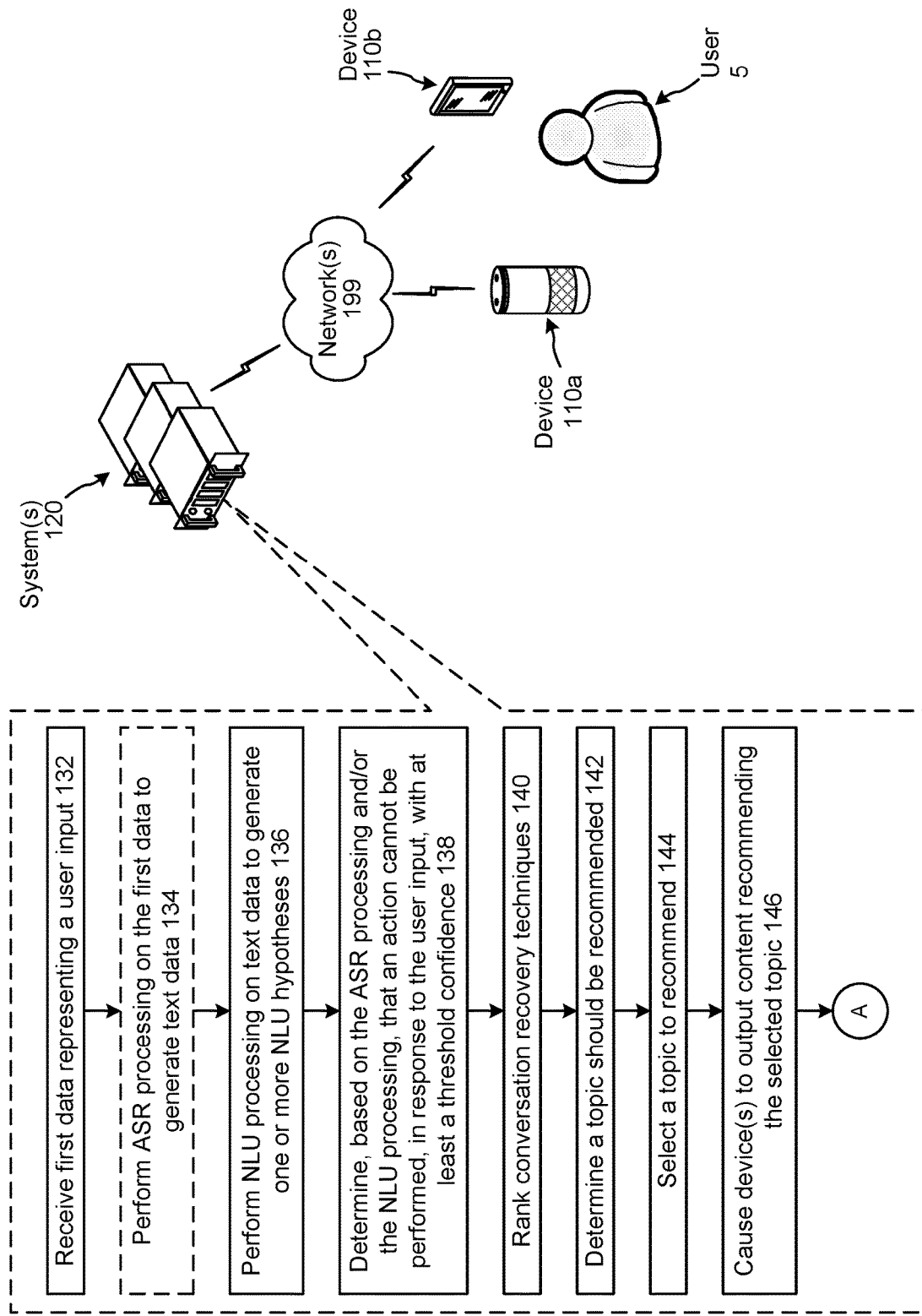

ALTERNATE RESPONSE GENERATION

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 1A and 1B illustrate a system configured to perform conversation recovery according to embodiments of the present disclosure.

DETAILED DESCRIPTION

Figure 1B:
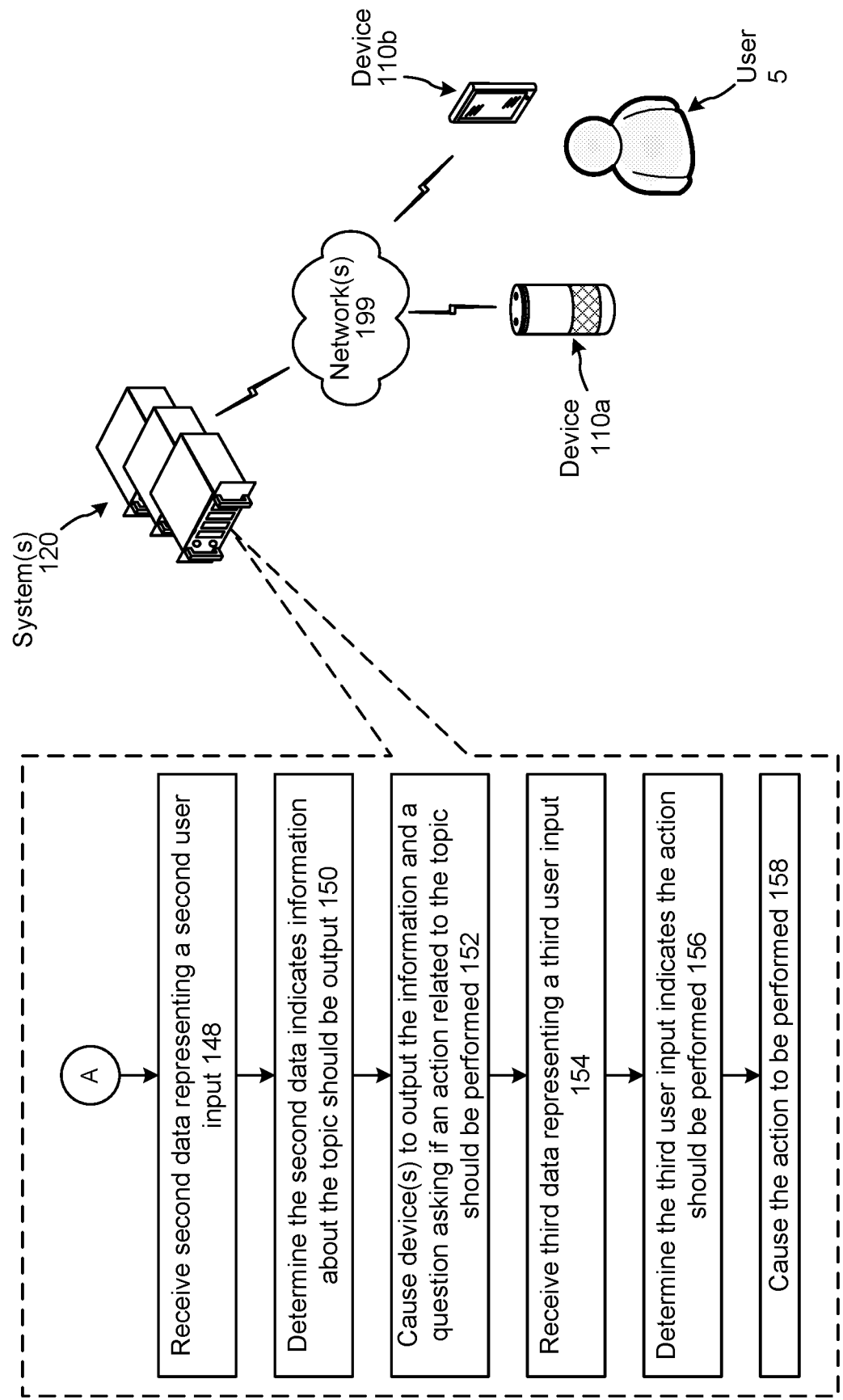

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

Certain systems may be configured to perform actions responsive to user inputs. For example, for the user input of "Alexa, play Adele music," a system may output music sung by an artist named Adele. For further example, for the user input of "Alexa, what is the weather," a system may output synthesized speech representing weather information for a geographic location of the user. In a further example, for the user input of "Alexa, send a message to John," a system may capture spoken message content and cause same to be output via a device registered to "John."

A system may encounter an error condition, for example the system may be incapable of performing an action responsive to a user input, or may be unsure of an appropriate action responsive to a user input. For example, a user may input "Alexa, do you know how to sing songs by Bruno Mars." The system may be configured to output audio recordings of songs sung by an artist named Bruno Mars, but the system may not be configured to "sing" such songs (e.g., in the form of synthesized speech). In this example, the system may output a general error message such as "I am sorry, but I am not sure how to respond," "I am sorry, but I do not understand," "I am not sure," or the like. Such output by the system may result in an undesirable user experience.

As a patentable improvement on handling such potential errors, a system may be configured to further engage a user prior to indicating the system is unable to perform an action responsive to a user input, is unsure of an appropriate action responsive to a user input, or otherwise indicate an error. For example, when the system would otherwise output content expressing response uncertainty, the system may determine a likely user intent corresponding to the user input, and may query the user regarding whether the user intended a particular action, corresponding to the likely intent, be performed. The system may then take different actions to provide the user with alternative content in a manner that recovers the conversational exchange between the user and the system rather than simply returning an error. Such an approach may generate a more beneficial user experience.

The present disclosure improves such conversation recovery by analyzing context information to recommend a topic that the system determines may be relevant to the user. Such conversation recovery processing may not, in at least some instances, be related to substance of the previous user input.

The system may have access to various data representing a context in which a user provides an input to the system. The system may use these inputs at runtime to make a determination regarding whether a user should be recommended a topic, as well as what that topic should be. The topic may be selected to provide the user with information that may be useful to the user even if the system cannot satisfy the original intent of the user. Such determination may be made using a trained machine learning model(s).

The system may cause a question be output to the user. The question may ask the user whether a different action and/or alternate topic may be of interest, for example "I did not understand, but would you like to know something interesting?" In response to the user responding affirmatively, the system may output content representing how the user may request the system to perform an action with respect to the alternative topic. For example, the system may output content representing how the user may cause the system to play a song, how the user may cause the system to output information about a particular individual (e.g., artist), how the user may cause the system to output information about a particular skill (e.g., a skill having a significantly high popularity among users of the system), or how the user may cause the system to output information about some other topic. A "skill" may be software running in a system that is akin to a software application running on a traditional computing device. That is, a skill may enable the system to execute specific functionality in order to provide data or produce some other requested output. Such system output may correspond to the framework "Sorry, I did not get that. But here is something else you may like: would you like to know about [topic]."

In at least some examples, the system may make determinations on a user-specific basis. For example, the system may consider various user-specific data at runtime to determine whether a specific user should be recommended a topic, as well as what that particular topic should be. Thus a different user may be recommended a different topic based on their information.

The system may be configured to incorporate user permissions and may only use a user's data for processes described herein if user permission is provided. The system may be configured to enable the user to revoke such permission at the user's discretion. The system may be defaulted to not use a user's data for processes described herein and, therefore, may be configured to only use a user's data for such processes if explicit permission has been provided.

If the user responds affirmatively to the recommended topic, the system may pass the user experience off to an appropriate component of the system (e.g., one that is configured to perform an action related to the topic). If the user responds negatively, does not respond at all, or the system is unsure whether the user's response was affirmative or negative, the system may cease interaction with the user, thereby enabling the user to interact with the system as the user desires.

The present disclosure has various benefits. One benefit is that the present disclosure provides a more beneficial user experience. This is due, at least in part, to the fact that the present disclosure's teachings decrease a frequency at which unresponsive actions are performed by a system. By decreasing the instances of such actions being performed, user/system interactions may be improved.

FIGS. 1A and 1B illustrate a system configured to perform conversation recovery. Although the figures and discussion herein illustrate certain operational steps of the system in a particular order, the steps described may be performed in a different order (as well as certain steps removed or added) without departing from the intent of the disclosure. As illustrated in FIGS. 1A and 1B, the system may include one or more devices (110a/110b), local to a user 5, in communication with one or more systems 120 across one or more networks 199.

The device 110a may receive audio representing a spoken user input of the user 5. The device 110a may generate audio data representing the audio and send the audio data to the system(s) 120, which the system(s) 120 receives (132). Alternatively, the device 110b may receive a text input representing a text-based user input of the user 5. The device 110b may generate text data representing the text input and may send the text data to the system(s) 120, which the system(s) 120 receives (132). Depending on configuration, the device (110a/110b) may send audio data and/or text data to the system(s) 120 via a companion application installed on the device (110a/110b). The companion application may enable the device (110a/110b) to communicate with the system(s) 120 via the network(s) 199. An example of a companion application is the Amazon Alexa application that operates on a phone/tablet.

If the system(s) 120 receives the user input as audio data, the system(s) 120 may perform (134) ASR processing on the audio data to generate text data. The system(s) 120 may perform (136) NLU processing on text data (e.g., either as received at step 132 or generated at step 134) to generate one or more NLU hypotheses. An NLU hypothesis refers to an intent indicator (representing a potential intent of the user) and one or more corresponding slots (with each slot corresponding to a portion of the text data that corresponds to an entity known to the system).

The system(s) 120 may determine an error condition. For example, the system may determine (138), based on the ASR processing and/or NLU processing, that an action cannot be performed, in response to the user input, with at least a threshold confidence. In other words, the system(s) 120 may determine the system(s) 120 cannot correctly respond to the user input. The system(s) 120's confidence in the ASR processing may not satisfy a threshold confidence, for example due to poor audio quality, user pronunciation errors, etc. In this case, the system(s) 120 may not understand the user input. Also or alternatively, none of the confidence values, associated with NLU hypotheses, may satisfy a threshold confidence. This may stem from poor ASR results (e.g., the system(s) 120 being unable to understand the user input), the system(s) 120 understanding the user input but the user input requesting something the system is not configured to do, etc. As a result of the system(s) 120 determining an error condition, for example, the system(s) 120 determining that the system(s) 120 cannot correctly respond to the user input, the system(s) 120 may generate an indicator representing an error message should be output to the user. An error message may indicate the system(s) 120 cannot understand the user input, may indicating the system(s) 120 understands the user input but cannot perform the requested action, etc.

After determining an action cannot be performed in response to the user input with at least a minimum confidence (i.e., after determining the error condition), the system(s) 120 may rank (140) conversation recovery techniques. The system(s) 120 may be configured to perform various conversation recovery techniques including, but not limited to, asking the user to repeat the user input (e.g., when the ASR confidence is low); identifying the most highly scored NLU hypothesis (that nonetheless does not satisfy the threshold confidence) and asking the user whether the user wants the system(s) 120 to perform an action responsive to the NLU hypothesis; a topic switching technique, etc. Each conversation recovery technique may be associated with specific criteria. Satisfaction of a particular conversation recovery technique's criteria may be considered when ranking the conversation recovery techniques.

After ranking, the system(s) 120 may determine (142) a topic should be recommended to the user. Such determination may result from determining at least one criterion of each conversation recovery technique (without regard to the topic switching technique) is not satisfied (e.g., not all criteria associated with a repeat user input technique is satisfied, not all criteria of a requesting confirmation technique is satisfied, etc.). Alternatively, such determination may result from all conversation recovery techniques, including the topic switching technique being ranked, and the topic switching technique being the top ranked.

After determining a topic should be recommended, the system(s) 120 may select (144) a topic to recommend. Illustrative topics that may be recommended include, for example, an artist corresponding to a most listened to artist by various users of the system(s) 120 over a past amount of time, an album corresponding to a most listened to album by various users of the system(s) 120 over a past amount of time, a skill corresponding to a top ranked skill (e.g., a top ranked game skill, a top ranked kids skill, a top relaxation skill, etc.) as determined from feedback of various users of the system(s) 120, a celebrity, a manner in which the user may customize actions performed by the system(s) 120 (e.g., information indicating how the user can be woken up with a particular type of music, information indicating how the user may customize a name of a list they maintain in a companion application, information indicating how the user may customize their news feed, etc.), etc. The topic to be recommended may not correspond to any particular skill. The topic to be recommended may be unrelated to substance of the present user input. For example, the topic to be recommend may be based on user profile data of the user 5 and/or system usage data corresponding to one or more users of the system(s) 120 (such as system usage data representing a most listened to artist, a most listened to album, a top ranked skill, etc.).

The topic to be recommended may correspond to a trending story. The system(s) 120 may select a trending story if, for example, the NLU results data indicate an entity corresponding to the trending story. The system(s) 120 may subscribe to a trending stories feed (or may include a trending stories feed). In selecting the topic, the system(s) 120 may determine whether one or more entities, represented in the NLU results data, is/are represented in the trending stories feed. A story may be deemed trending based on manual human input or using automated methods (e.g., based on a computing component determining it has received the story (or a group of related stories) from at least a threshold amount of different data providers within a threshold amount of time).

The topic to be recommended may not relate to the user input. For example, the user input may request the playing of music. A music skill may be unable to play the request music. In response, the system(s) 120 may recommend a non-music topic (e.g., information related to a top-rated skill that is not a music skill, etc.).

The system(s) 120 may cause (146) the device (110*a*/110*b*) to output content recommending the topic. The device (110*a*/110*b*) may output audio recommending the topic and/or may display text recommending the topic. Such content may correspond to the framework "sorry, I am not understanding, but do you want to know about [topic]."

After or while outputting the content, the device 110*a* may receive audio representing a spoken user input of the user 5. The device 110*a* may generate audio data representing the audio and send the audio data to the system(s) 120, which the system(s) 120 receives (148). Alternatively, the device 110*b* may receive a text input representing a text-based user input of the user 5. The device 110*b* may generate text data representing the text input and may send the text data to the system(s) 120, which the system(s) 120 receives (148).

The system(s) 120 may determine (150) the second user input indicates the user wants information about the topic to be output. Such determination may include performing NLU processing on text data (either received at step 146 or as determined from ASR processing of audio data received at step 146). The system(s) 120 may thereafter cause (152) the device (110*a*/110*b*) to output the information along with a question asking if the user desires the system perform an action related to the topic. For example, if the topic relates to a particular skill, the question may ask the user whether the system should enable the skill with respect to the user's profile and/or whether the system should launch the skill. For further example, if the topic relates to an artist, the question may ask the user whether the system should play a song sung by the artist. Other examples are possible.

After or while outputting the information and question, the device 110*a* may receive audio representing a spoken user input of the user 5. The device 110*a* may generate audio data representing the audio and send the audio data to the system(s) 120, which the system(s) 120 receives (154). Alternatively, the device 110*b* may receive a text input representing a text-based user input of the user 5. The device 110*b* may generate text data representing the text input and may send the text data to the system(s) 120, which the system(s) 120 receives (154).

The system(s) 120 may determine (156) the third user input indicates the user wants the action be performed. Such determination may include performing NLU processing on text data (either received at step 154 or as determined from ASR processing of audio data received at step 154). The system(s) 120 may thereafter cause (158) the action to be performed.

In some examples, the system(s) 120 may not ask the user 5 whether the user 5 wants the action to be performed. Instead, the system(s) 120 may simply output the information and perform the action without further user input. Whether the system(s) 120 performs the action without soliciting user input permitting same may be based on user preferences. For example, the user 5 may indicate to the system(s) 120 that, if the user 5 requests the information be output, that the system(s) 120 can thereafter perform the action as well without receiving further user input.

In at least some instances, the user 5 may not provide a second user input (received at step 148) or third user input (received at step 154), the user 5 may provide a second (or third) user input (received at step 146) that declines the recommended topic (or action), or the system(s) 120 may be unable to determine whether the second (or third) user input accepts or declines the recommended topic (or action). In such instances, the system(s) 120 may cease processing. This may close a dialog session between the user 5 and the system(s) 120, thereby enabling the user 5 to start a new dialog session with the system(s) 120 if the user 5 so desires.

As used herein, a "dialog," "dialog session," "session," or the like refers to various related user inputs and system outputs, for example inputs and outputs related to an ongoing exchange between a user and the system. When the system(s) 120 receives a user input, the system(s) 120 may associate the data (e.g., audio data or text data) representing the user input with a session identifier. The session identifier may be associated with various speech processing data (e.g., ASR results data, NLU results data, etc.) related to processing of the user input. When the system(s) 120 invokes a skill, the system(s) 120 may send the session identifier to the skill in addition to NLU results data. If the skill outputs data for presentment to the user, the skill may associate the data with the session identifier. The foregoing is illustrative and, thus, one skilled in the art will appreciate that a session identifier may be used to track data transmitted between various components of the system(s) 120.

A user input and performance of a corresponding action, responsive to the user input, may be referred to as a dialog "turn." A session identifier may be associated with multiple related turns corresponding to consecutive related user inputs. One user input may be considered related to a subsequent user input, thereby causing a single session identifier to be associated with both user inputs, based on, for example, a length of time between receipt of the first user input and receipt of the subsequent user input and/or a length of time between performance of an action responsive to the first user input and receipt of the subsequent user input.

Figure 2A:
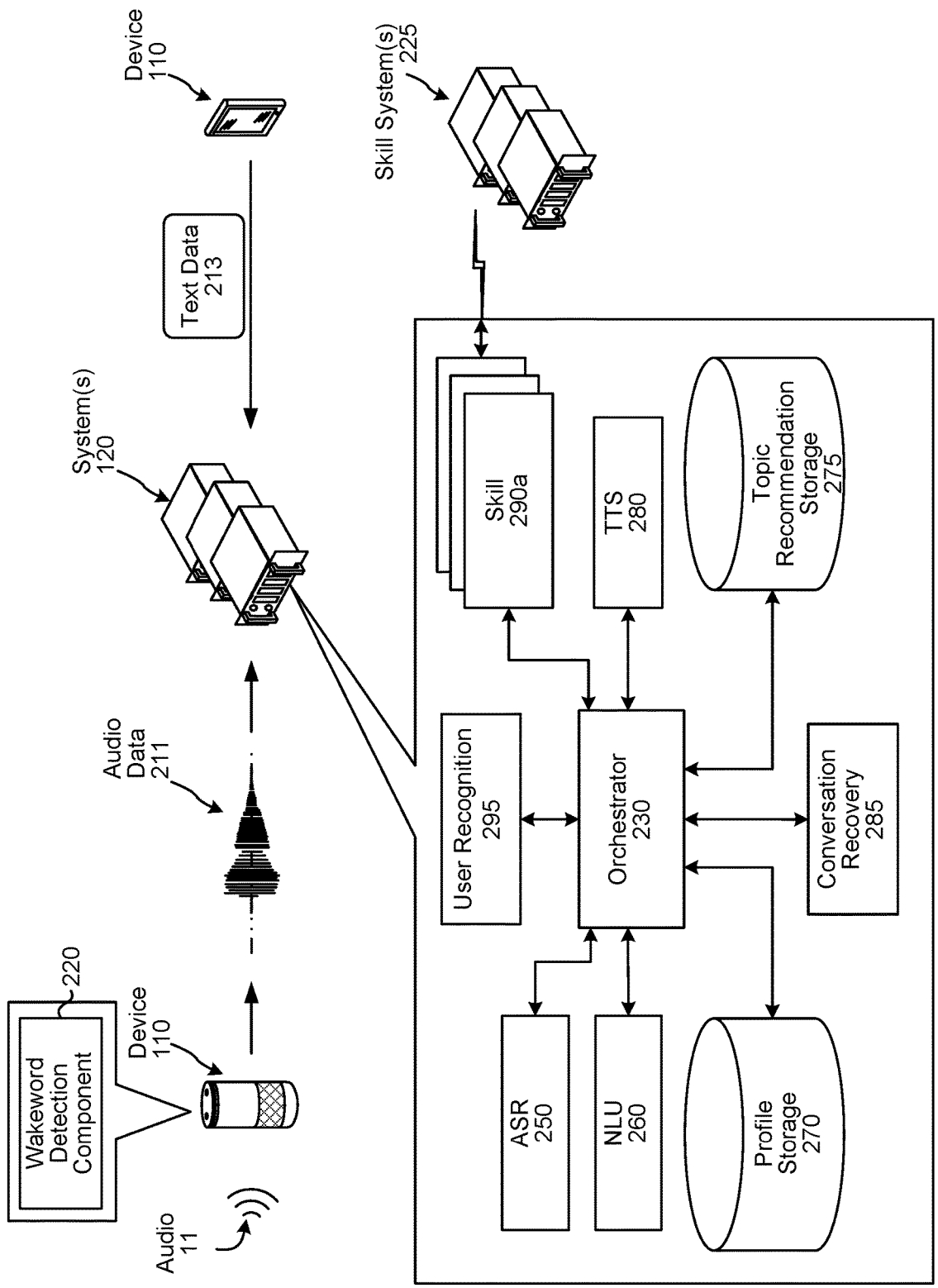
FIG. 2A is a conceptual diagram of components of a system according to embodiments of the present disclosure.

The system may operate using various components as illustrated in FIG. 2A. The various components may be located on same or different physical devices. Communication between various components may occur directly or across a network(s) 199.

An audio capture component(s), such as a microphone or array of microphones of a device 110, captures audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may use a wakeword detection component 220 to perform wakeword detection to determine when a user intends to speak an input to the device 110. An example wakeword is "Alexa."

Wakeword detection is typically performed without performing linguistic analysis, textual analysis, or semantic analysis. Instead, the audio data representing the audio 11 is analyzed to determine if specific characteristics of the audio data match preconfigured acoustic waveforms, audio signatures, or other data to determine if the audio data "matches" stored audio data corresponding to a wakeword.

The wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without MINI being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110 may "wake" and begin transmitting audio data 211, representing the audio 11, to the system(s) 120. The audio data 211 may include data corresponding to the wakeword, or the portion of the audio data 211 corresponding to the wakeword may be removed by the device 110 prior to sending the audio data 211 to the system(s) 120.

Upon receipt by the system(s) 120, the audio data 211 may be sent to an orchestrator component 230. The orchestrator component 230 may include memory and logic that enables the orchestrator component 230 to transmit various pieces and forms of data to various components of the system(s) 120, as well as perform other operations as described herein.

Figure 2B:
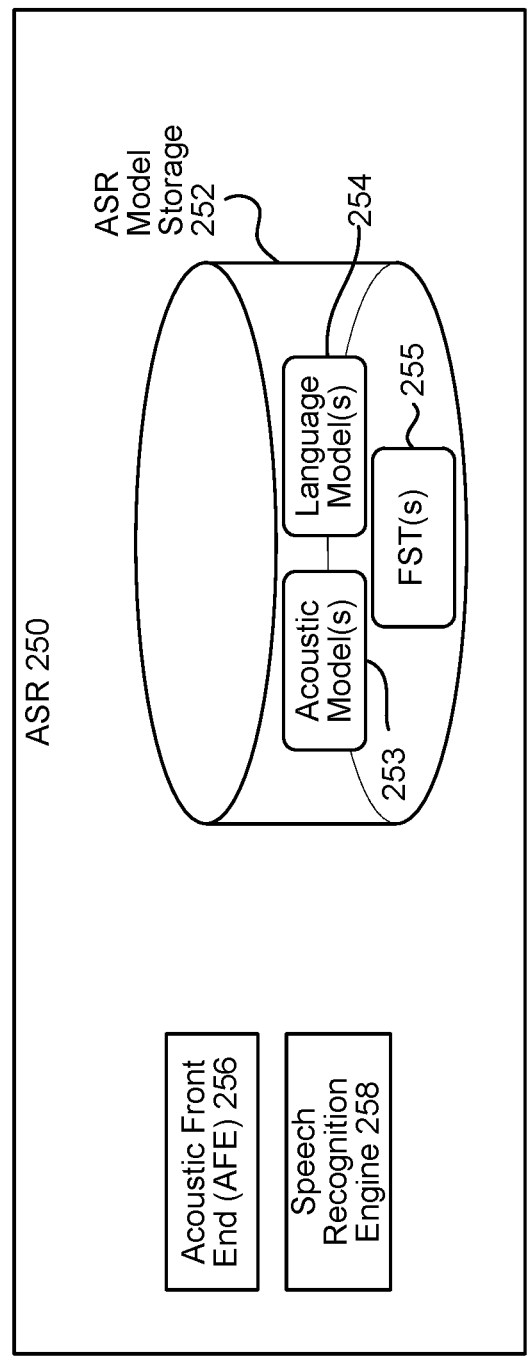
FIG. 2B is a conceptual diagram of automatic speech recognition components according to embodiments of the present disclosure.

The orchestrator component 230 may send the audio data 211 to an ASR component 250. The ASR component 250 transcribes the audio data 211 into text data. FIG. 2B illustrates example components of the ASR component 250. The ASR component 250 transcribes audio data into text data representing the words of the speech contained in the audio data. The text data may then be used by other components for various purposes, such as executing system commands, inputting data, etc. The ASR component 250 interprets the audio data 211 based on a similarity between the spoken user input and pre-established language models 254 stored in an ASR model storage 252. For example, the ASR component 250 may compare the audio data 211 with models for sounds (e.g., subword units or phonemes) and sequences of sounds to identify words that match the sequence of sounds spoken in the user input of the audio data 211. Alternatively, the ASR component 250 may use a finite state transducer (FST) 255 to implement the language model functions, as explained below.

The different ways a spoken user input may be interpreted (i.e., the different ASR hypotheses) may each be assigned a confidence value representing a likelihood that a particular set of words matches those spoken in the user input. The confidence value may be based on a number of factors including, for example, a similarity of the sound in the user input to models for language sounds (e.g., an acoustic model 253 stored in the ASR models storage 252), and a likelihood that a particular word that matches the sounds would be included in a sentence at the specific location (e.g., using a language or grammar model). Thus, each potential textual interpretation of the spoken user input (each potential ASR hypothesis) is associated with a confidence value. Based on the considered factors and the assigned confidence value, the ASR component 250 outputs the most likely text corresponding to the audio data 211. The ASR component 250 may also output multiple ASR hypotheses in the form of an N-best list, with each ASR hypothesis being associated with a respective confidence value.

The ASR component 250 may include an acoustic front end (AFE) 256 and speech recognition engine 258. The AFE 256 transforms the audio data 211 into data for processing by the speech recognition engine 258. The speech recognition engine 258 compares data (received from the AFE 256) with acoustic models 253, language models 254, FST 255, and/or other data models and information for recognizing the speech represented in the audio data 211. The AFE 256 may reduce noise in the audio data 211 and divide the digitized audio data into frames representing time intervals for which the AFE 256 determines a number of values, called features, representing the qualities of the audio data, along with a set of those values, called a feature vector, representing the features/qualities of the audio data within the frame. Typically, audio frames may be 10 ms each. Many different features may be determined, as known in the art, and each feature represents some quality of the audio that may be useful for ASR processing. A number of approaches may be used by the AFE 256 to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 258 may process the AFE 256's output with reference to information stored in the ASR model storage 252. Alternatively, post front-end processed data (such as feature vectors) may be received by the speech recognition engine 258 from another source besides the AFE 256. For example, the device 110 may process audio data into feature vectors (for example using an on-device AFE) and transmit that information to the system(s) 120 across the network(s) 199. The feature vectors may arrive at the system(s) 120 encoded, in which case they may be decoded prior to processing by the speech recognition engine 258.

The speech recognition engine 258 attempts to match received feature vectors to language phonemes and words as known in the stored acoustic models 253, language models 254, and FST(s) 255. The speech recognition engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR processing will output one or more ASR hypotheses that make sense grammatically. The specific models used may be general models or may be models corresponding to a particular domain, such as music, banking, etc.

The speech recognition engine 258 may use a number of techniques to match feature vectors to phonemes or other phonetic units, such as biphones, triphones, etc. One common technique is using Hidden Markov Models (HMMs). HMMs are used to determine probabilities that feature vectors may match phonemes. Using HMMs, a number of states are presented, in which the states together represent a potential phoneme (or other speech unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 258, the state may change or stay the same, based on the processing of the new feature vectors. A Viterbi algorithm may be used to find the most likely sequence of states based on the processed feature vectors.

Probabilities and states may be calculated using a number of techniques. For example, probabilities for each state may be calculated using a Gaussian model, Gaussian mixture model, or other technique based on the feature vectors. Techniques such as maximum likelihood estimation (MLE) may be used to estimate the probability of phoneme states.

In addition to calculating potential states for one phoneme as a potential match to a feature vector, the speech recognition engine 258 may also calculate potential states for other phonemes. In this manner multiple states and state transition probabilities may be calculated.

The probable states and probable state transitions calculated by the speech recognition engine 258 are formed into paths. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. When combining scores as part of the ASR processing, scores may be multiplied together (or combined in other ways) to reach a desired combined score or probabilities may be converted to the log domain and added to assist processing.

The speech recognition engine 258 may also compute scores of branches of the paths based on language models or grammars. Language modeling involves determining scores for what words are likely to be used together to form coherent words and sentences. Application of a language model may improve the likelihood that the ASR component 250 correctly interprets the speech contained in the audio data. For example, acoustic model processing returning the potential phoneme paths of "B A T", "B A D", and "B E D" may be adjusted by a language model to adjust the recognition scores of "B A T" (interpreted as the word "bat"), "B A D" (interpreted as the word "bad"), and "B E D" (interpreted as the word "bed") based on the language context of each word within the spoken user input. The language modeling may be determined from a text corpus and may be customized for particular applications.

As the speech recognition engine 258 determines potential words from the audio, the lattice may become very large as many potential sounds and words are considered as potential matches for the audio. The potential matches may be illustrated as a word result network representing possible sequences of words that may be recognized and the likelihood of each sequence.

The text data output by the ASR component 250 represents one or more than one (e.g., in the form of an N-best list) ASR hypotheses representing speech represented in the audio data 211. The ASR component 250 may output text data that includes a top scoring ASR hypothesis or may include an N-best list including multiple ASR hypotheses.

In certain situations, the ASR component 250 may not be confident in the ASR processing. For example, the processed audio data may have a noise level that renders the speech difficult to understand by the ASR component 250. Such situation may be represented by a top scoring ASR hypothesis failing to satisfy a condition (e.g., a threshold confidence). Such situation may be considered an error condition herein.

Referring back to FIG. 2A, the device 110 may send text data 213 to the system(s) 120. Upon receipt by the system(s) 120, the text data 213 may be sent to the orchestrator component 230. The orchestrator component 230 may send text data (e.g., text data output by the ASR component 250 or the received text data 213) to the NLU component 260.

Figure 2C:
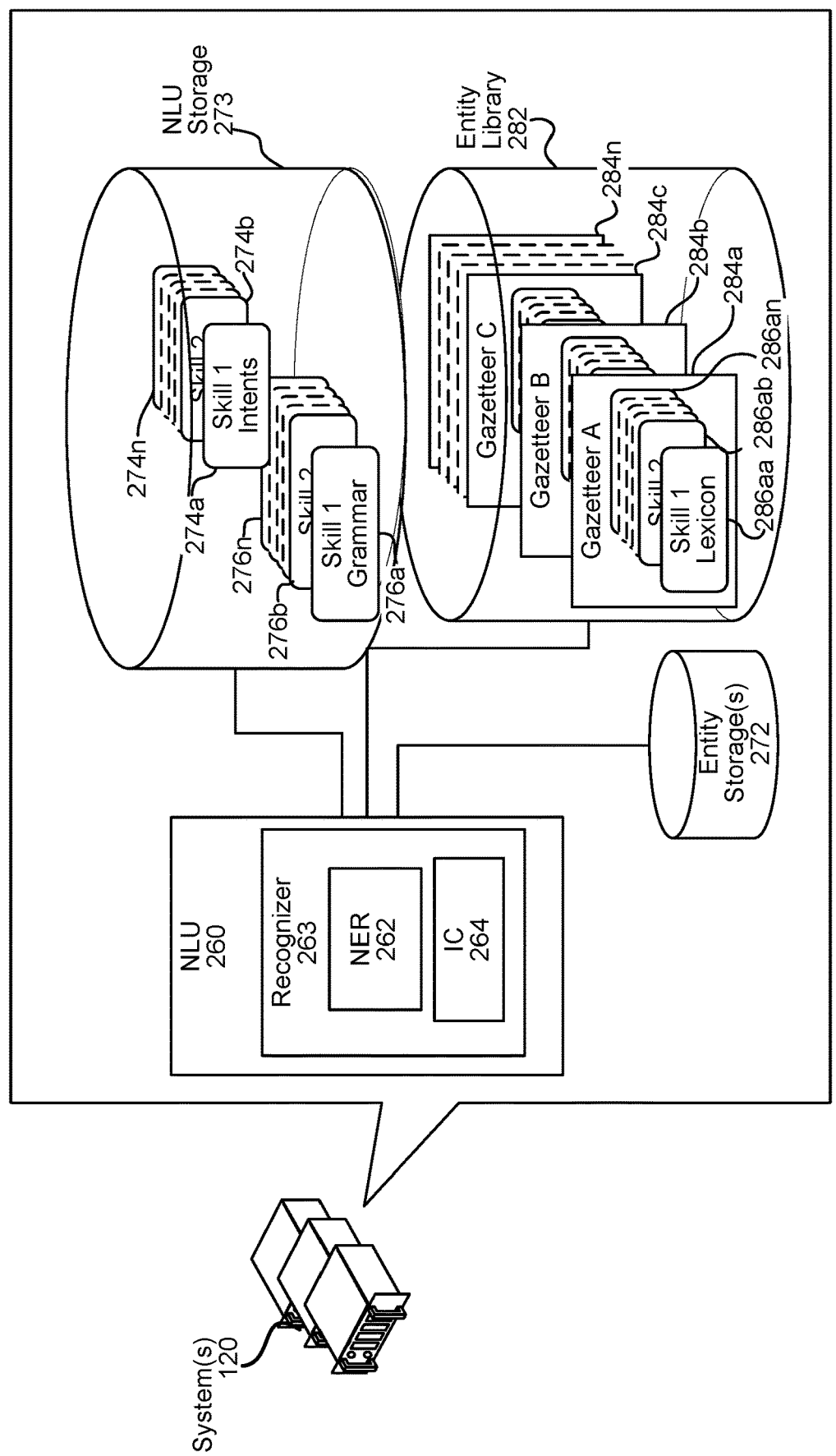
FIG. 2C is a conceptual diagram of how natural language understanding processing may be performed according to embodiments of the present disclosure.

FIG. 2C illustrates how NLU processing may be performed on the text data. Generally, the NLU component 260 attempts to make a semantic interpretation of text data input thereto. That is, the NLU component 260 determines the meaning behind text data based on the individual words and/or phrases represented therein. The NLU component 260 interprets text data to derive an intent of the user as well as pieces of the text data that allow a device (e.g., the device 110, the system(s) 120, a skill system(s) 225, etc.) to perform that intent. For example, if the NLU component 260 receives text data corresponding to "tell me the weather," the NLU component 260 may determine that the user intends the system to output weather information.

The NLU component 260 may process text data corresponding to several ASR hypotheses. For example, if the ASR component 250 outputs text data including an N-best list of ASR hypotheses, the NLU component 260 may process the text data with respect to all (or a portion of) the ASR hypotheses represented therein. Even though the ASR component 250 may output an N-best list of ASR hypotheses, the NLU component 260 may be configured to only process with respect to one or more top scoring ASR hypothesis in the N-best list.

The NLU component 260 may annotate text data by parsing and/or tagging the text data. For example, for the text data "tell me the weather for Seattle," the NLU component 260 may tag "Seattle" as a location for the weather information.

The NLU component 260 may include one or more recognizers 263. Each recognizer 263 may be associated with a different skill 290. Each recognizer 263 may process with respect to text data input to the NLU component 260. Each recognizer 263 may operate at least partially in parallel with other recognizers 263 of the NLU component 260.

Each recognizer 263 may include a named entity recognition (NER) component 262. The NER component 262 attempts to identify grammars and lexical information that may be used to construe meaning with respect to text data input therein. The NER component 262 identifies portions of text data that correspond to a named entity that may be applicable to processing performed by a skill 290, associated with the recognizer 263 implementing the NER component 262. The NER component 262 (or other component of the NLU component 260) may also determine whether a word refers to an entity whose identity is not explicitly mentioned in the text data, for example "him," "her," "it" or other anaphora, exophora, or the like.

Each recognizer 263, and more specifically each NER component 262, may be associated with a particular grammar model and/or database 273, a particular set of intents/actions 274, and a particular personalized lexicon 286. Each gazetteer 284 may include skill-indexed lexical information associated with a particular user and/or device 110. For example, a Gazetteer A (284a) includes skill-indexed lexical information 286aa to 286an. A user's music skill lexical information might include album titles, artist names, and song names, for example, whereas a user's contact list skill lexical information might include the names of contacts. Since every user's music collection and contact list is presumably different. This personalized information improves later performed entity resolution.

An NER component 262 applies grammar models 276 and lexical information 286 associated with the skill 290 (associated with the recognizer 263 implementing the NER component 262) to determine a mention of one or more entities in text data. In this manner, the NER component 262 identifies "slots" (each corresponding to one or more particular words in text data) that may be useful for later processing. The NER component 262 may also label each slot with a type (e.g., noun, place, city, artist name, song name, etc.).

Each grammar model 276 includes the names of entities (i.e., nouns) commonly found in speech about the particular skill 290 to which the grammar model 276 relates, whereas the lexical information 286 is personalized to the user and/or the device 110 from which the user input originated. For example, a grammar model 276 associated with a shopping skill may include a database of words commonly used when people discuss shopping.

A downstream process called entity resolution (discussed in detail elsewhere herein) links a slot of text data to a specific entity known to the system. To perform entity resolution, the NLU component 260 may utilize gazetteer information (284a-284n) stored in an entity library storage 282. The gazetteer information 284 may be used to match text data (representing a portion of the user input) with text data representing known entities, such as song titles, contact names, etc. Gazetteers 284 may be linked to users (e.g., a particular gazetteer may be associated with a specific user's music collection), may be linked to certain skills 290 (e.g., a shopping skill, a music skill, a video skill, etc.), or may be organized in a variety of other ways.

Each recognizer 263 may also include an intent classification (IC) component 264. An IC component 264 parses text data to determine an intent(s) (associated with the skill 290 associated with the recognizer 263 implementing the IC component 264) that potentially represents the user input. An intent represents to an action a user desires be performed. An IC component 264 may communicate with a database 274 of words linked to intents. For example, a music intent database may link words and phrases such as "quiet," "volume off," and "mute" to a <Mute> intent. An IC component 264 identifies potential intents by comparing words and phrases in text data (representing at least a portion of the user input) to the words and phrases in an intents database 274 (associated with the skill 290 that is associated with the recognizer 263 implementing the IC component 264).

The intents identifiable by a specific IC component 264 are linked to skill-specific (i.e., the skill 290 associated with the recognizer 263 implementing the IC component 264) grammar frameworks 276 with "slots" to be filled. Each slot of a grammar framework 276 corresponds to a portion of text data that the system believes corresponds to an entity. For example, a grammar framework 276 corresponding to a <PlayMusic> intent may correspond to text data sentence structures such as "Play {Artist Name}," "Play {Album Name}," "Play {Song name}," "Play {Song name} by {Artist Name}," etc. However, to make entity resolution more flexible, grammar frameworks 276 may not be structured as sentences, but rather based on associating slots with grammatical tags.

For example, an NER component 262 may parse text data to identify words as subject, object, verb, preposition, etc. based on grammar rules and/or models prior to recognizing named entities in the text data. An IC component 264 (implemented by the same recognizer 263 as the NER component 262) may use the identified verb to identify an intent. The NER component 262 may then determine a grammar model 276 associated with the identified intent. For example, a grammar model 276 for an intent corresponding to <PlayMusic> may specify a list of slots applicable to play the identified "object" and any object modifier (e.g., a prepositional phrase), such as {Artist Name}, {Album Name}, {Song name}, etc. The NER component 262 may then search corresponding fields in a lexicon 286 (associated with the skill 290 associated with the recognizer 263 implementing the NER component 262), attempting to match words and phrases in text data the NER component 262 previously tagged as a grammatical object or object modifier with those identified in the lexicon 286.

An NER component 262 may perform semantic tagging, which is the labeling of a word or combination of words according to their type/semantic meaning. An NER component 262 may parse text data using heuristic grammar rules, or a model may be constructed using techniques such as Hidden Markov Models, maximum entropy models, log linear models, conditional random fields (CRF), and the like. For example, an NER component 262 implemented by a music skill recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 262 identifies "Play" as a verb based on a word database associated with the music skill, which an IC component 264 (also implemented by the music skill recognizer) may determine corresponds to a <PlayMusic> intent. At this stage, no determination has been made as to the meaning of "mother's little helper" or "the rolling stones," but based on grammar rules and models, the NER component 262 has determined the text of these phrases relates to the grammatical object (i.e., entity) of the user input represented in the text data.

An NER component 262 may tag text data to attribute meaning thereto. For example, an NER component 262 may tag "play mother's little helper by the rolling stones" as: {skill} Music, {intent} <PlayMusic>, {artist name} rolling stones, {media type} SONG, and {song title} mother's little helper. For further example, the NER component 262 may tag "play songs by the rolling stones" as: {skill} Music, {intent} <PlayMusic>, {artist name} rolling stones, and {media type} SONG.

Figure 2D:
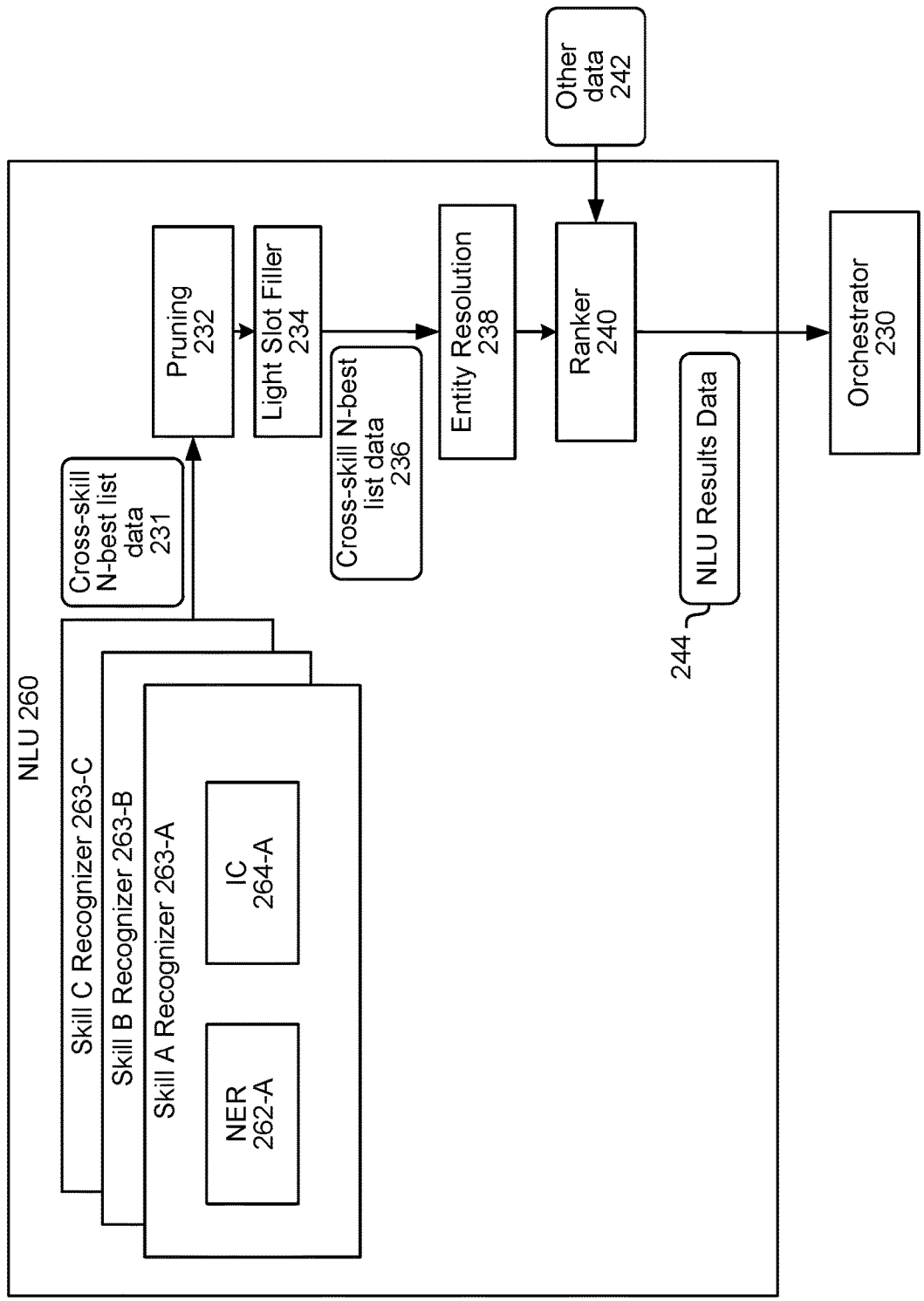
FIG. 2D is a conceptual diagram of how natural language understanding processing may be performed according to embodiments of the present disclosure.

The NLU component 260 may generate cross-skill N-best list data 231, which may include a list of NLU hypotheses output by each recognizer 263 (as illustrated in FIG. 2D). A recognizer 263 may output tagged text data generated by an NER component 262 and an IC component 264 operated by the recognizer 263, as described above. Each NLU hypothesis, including an intent indicator and text/slots identified by the NER component 262, may be grouped as an NLU hypothesis represented in the cross-skill N-best list data 231. Each NLU hypothesis may also be associated with a value representing the NLU component's confidence in the NLU hypothesis. For example, the cross-skill N-best list data 540 may be represented as, with each line representing a separate NLU hypothesis:

[0.95] Intent: <PlayMusic> ArtistName: Lady Gaga SongName: Poker Face

[0.95] Intent: <PlayVideo> ArtistName: Lady Gaga VideoName: Poker Face

[0.01] Intent: <PlayMusic> ArtistName: Lady Gaga AlbumName: Poker Face

[0.01] Intent: <PlayMusic> SongName: Pokerface

The NLU component 260 may send the cross-skill N-best list data 231 to a pruning component 232. The pruning component 232 may sort the NLU hypotheses represented in the cross-skill N-best list data 231 according to their respective scores. The pruning component 232 may then perform value thresholding with respect to the cross-skill N-best list data 231. For example, the pruning component 232 may select NLU hypotheses represented in the cross-skill N-best list data 231 associated with confidence values satisfying (e.g., meeting and/or exceeding) a threshold confidence value. The pruning component 232 may also or alternatively perform number of NLU hypothesis thresholding. For example, the pruning component 232 may select a maximum threshold number of top scoring NLU hypotheses. The pruning component 232 may generate cross-skill N-best list data 236 including the selected NLU hypotheses. The purpose of the pruning component 232 is to create a reduced list of NLU hypotheses so that downstream, more resource intensive, processes may only operate on the NLU hypotheses that most likely represent the user's intent.

The NLU component 260 may also include a light slot filler component 234. The light slot filler component 234 can take text data from slots, represented in the NLU hypotheses output by the pruning component 232, and alter it to make the text data more easily processed by downstream components. The light slot filler component 234 may perform low latency operations that do not involve heavy operations such as reference to one or more entity storages. The purpose of the light slot filler component 234 is to replace words with other words or values that may be more easily understood by downstream system components. For example, if an NLU hypothesis includes the word "tomorrow," the light slot filler component 234 may replace the word "tomorrow" with an actual date for purposes of downstream processing. Similarly, the light slot filler component 552 may replace the word "CD" with "album" or the words "compact disc." The replaced words are then included in the cross-skill N-best list data 236.

The NLU component 260 sends the cross-skill N-best list data 236 to an entity resolution component 238. The entity resolution component 238 can apply rules or other instructions to standardize labels or tokens from previous stages into an intent/slot representation. The precise transformation may depend on the skill 290. For example, for a travel skill, the entity resolution component 238 may transform text data corresponding to "Boston airport" to the standard BOS three-letter code referring to the airport. The entity resolution component 238 can refer to an entity storage(s) (including text data representing entities known to the system) to resolve the precise entity referred to in each slot of each NLU hypothesis represented in the cross-skill N-best list data 236. Specific intent/slot combinations may also be tied to a particular source, which may then be used to resolve the text data. In the example "play songs by the stones," the entity resolution component 238 may reference a personal music catalog, Amazon Music account, user profile data, or the like. The entity resolution component 238 may output text data including an altered N-best list that is based on the cross-skill N-best list data 236, and that includes more detailed information (e.g., entity IDs) about the specific entities mentioned in the slots and/or more detailed slot data that can eventually be used by a skill 290. The NLU component 260 may include multiple entity resolution components 238 and each entity resolution component 238 may be associated with one or more particular skills 290.

The entity resolution component 238 may use frameworks linked to the intent to determine what database fields should be searched to determine the meaning of tagged entities, such as searching a user's gazetteer 284 for similarity with the framework slots. For example, a framework for a <PlayMusic> intent might indicate to attempt to resolve an identified object based on {Artist Name}, {Album Name}, and {Song name}, and another framework for the same intent might indicate to attempt to resolve an object modifier based on {Artist Name}, and resolve the object based on {Album Name} and {Song Name} linked to an identified {Artist Name}. If the search of the gazetteer 284 does not resolve a slot/field using gazetteer information, the entity resolution component 238 may search a database of generic words associated with the skill 290 (in the entity storage(s) 272). For example, if the text data includes "play songs by the rolling stones," after failing to determine an album name or song name called "songs" by "the rolling stones," the entity resolution component 238 may search the skill vocabulary for the word "songs." In the alternative, generic words may be checked before the gazetteer information, or both may be tried, potentially producing two different results.

The entity resolution component 238 may not be successful in resolving every entity and filling every slot represented in the cross-skill N-best list data 236. This may result in the entity resolution component 238 outputting incomplete results.

The NLU component 260 may include a ranker component 240. The ranker component 240 may assign a particular confidence value to each NLU hypothesis input therein. The confidence value of an NLU hypothesis may represent a confidence of the system in the NLU processing performed with respect to the NLU hypothesis. The confidence value of a particular NLU hypothesis may be affected by whether the NLU hypothesis has unfilled slots. For example, if an NLU hypothesis associated with a first skill component includes slots that are all filled/resolved, that NLU hypothesis may be assigned a higher confidence value than another NLU hypothesis including at least some slots that are unfilled/unresolved by the entity resolution component 238.

The ranker component 240 may apply re-scoring, biasing, or other techniques to determine the top scoring NLU hypotheses. To do so, the ranker component 240 may consider not only the data output by the entity resolution component 238, but may also consider other data 242. The other data 242 may include a variety of information. The other data 242 may include skill rating or popularity data. For example, if one skill 290 has a particularly high rating, the ranker component 240 may increase the confidence value of an NLU hypothesis associated with that skill 290. The other data 242 may also include information about skills 290 that have been enabled for the user identifier and/or device identifier associated with the current user input. For example, the ranker component 240 may assign higher confidence values to NLU hypotheses associated with enabled skills 290 than NLU hypotheses associated with non-enabled skills 290. The other data 242 may also include data indicating user usage history, such as if the user identifier associated with the current user input is regularly associated with user input that invokes a particular skill 290 or does so at particular times of day. The other data 242 may additionally include data indicating date, time, location, weather, type of device 110, user identifier, device identifier, context, as well as other information. For example, the ranker component 240 may consider when any particular skill 290 is currently active (e.g., music being played, a game being played, etc.) with respect to the user or device associated with the current user input. The other data 242 may also include device type information. For example, if the device 110 does not include a display, the ranker component 240 may decrease the confidence values associated with NLU hypotheses that would result in displayable content being output by the system.

Following ranking by the ranker component 240, the NLU component 260 may output NLU results data 244 to the orchestrator component 230. The NLU results data 244 may include multiple top scoring NLU hypotheses (e.g., in the form of an N-best list) as determined by the ranker component 240. Alternatively, the NLU results data 244 may include the top scoring NLU hypothesis as determined by the ranker component 240. The NLU results data 244 may be a rich data object representing intents and resolved entities.

If at least one NLU hypothesis (represented in the NLU results data 244) satisfies a condition (e.g., a threshold confidence), the orchestrator component 230 may send at least a portion of the NLU results data 244 to a skill 290, thereby invoking the skill 290 to perform an action responsive to the user input. If none of the NLU hypotheses (represented in the NLU results data 244) satisfies the condition, the NLU component 260 may not be confident enough in the NLU processing to justify sending the NLU results data 244 to a skill to execute with respect to an intent represented in the NLU results data 244. Such a situation may be considered an error condition.

A "skill" may be software running on the system(s) 120 that is akin to a software application running on a traditional computing device. That is, a skill component 290 may enable the system(s) 120 to execute specific functionality in order to provide data or produce some other requested output. The system(s) 120 may be configured with more than one skill 290. For example, a weather service skill may enable the system(s) 120 to output weather information, a car service skill may enable the system(s) 120 to book a trip with respect to a taxi or ride sharing service, a restaurant skill may enable the system(s) 120 to order a pizza with respect to the restaurant's online ordering system, etc. A skill 290 may operate in conjunction between the system(s) 120 and other devices, such as the device 110, in order to complete certain functions. Inputs to a skill 290 may come from speech processing interactions or through other interactions or input sources. A skill 290 may include hardware, software, firmware, or the like that may be dedicated to a particular skill 290 or shared among different skills 290.

In addition or alternatively to being implemented by the system(s) 120, a skill 290 may be implemented at least partially by a skill system(s) 225. Such may enable a skill system(s) 225 to execute specific functionality in order to provide data or perform some other action requested by a user.

Types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system(s) 120 may be configured with a single skill 290 dedicated to interacting with more than one skill system 225. The system(s) 120 may be configured with a skill component 290 that communicates with more than one type of device (e.g., different types of home automation devices).

Unless expressly stated otherwise, reference to a skill, skill device, or skill component may include a skill 290 operated by the system(s) 120 and/or the skill system(s) 225. The functionality described herein as a skill may be referred to using many different terms, such as an action, bot, app, or the like.

As illustrated in FIG. 2A, the system(s) 120 may include a TTS component 280 that generates audio data (e.g., synthesized speech) from text data using one or more different methods. Text data input to the TTS component 280 may come from a skill 290, the orchestrator component 230, or another component of the system.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The system(s) 120 may include profile storage 270. The profile storage 270 may include a variety of information related to individual users, groups of users, devices, etc. that interact with the system. A "profile" refers to a set of data associated with a user, device, etc. The data of a profile may include preferences specific to the user, device, etc.; input and output capabilities of the device; internet connectivity information; user bibliographic information; subscription information; as well as other information.

The profile storage 270 may include one or more user profiles, with each user profile being associated with a different user identifier. Each user profile may include various user identifying information. Each user profile may also include preferences of the user and/or one or more device identifiers, representing one or more devices of the user.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device identifiers representing one or more devices associated with the group profile.

The profile storage 270 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household. Each device profile may include input/output capabilities of each device, and one or more capabilities performable by each device, and Internet connectivity information for each device, for example.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

The system(s) 120 may include a user recognition component 295 that recognizes one or more users associated with data input to the system(s) 120. The user recognition component 295 may take as input the audio data 211. The user recognition component 295 may perform user recognition by comparing speech characteristics in the audio data 211 to stored speech characteristics of users. The user recognition component 295 may also or alternatively perform user recognition by comparing biometric data (e.g., fingerprint data, iris data, etc.), received by the system(s) 120 in correlation with a user input, to stored biometric data of users. The user recognition component 295 may also or alternatively perform user recognition by comparing image data (e.g., including a representation of at least a feature of a user), received by the system(s) 120 in correlation with a user input, with stored image data including representations of features of different users. The user recognition component 295 may perform additional user recognition processes, including those known in the art. For a particular user input, the user recognition component 295 may perform processing with respect to stored data of users associated with the device 110 that captured the user input.

The user recognition component 295 determines whether a user input originated from a particular user. For example, the user recognition component 295 may generate a first value representing a likelihood that a user input originated from a first user, a second value representing a likelihood that the user input originated from a second user, etc. The user recognition component 295 may also determine an overall confidence regarding the accuracy of user recognition operations.

The user recognition component 295 may output a single user identifier corresponding to the most likely user that originated the user input. Alternatively, the user recognition component 295 may output multiple user identifiers (e.g., in the form of an N-best list) with respective values representing likelihoods of respective users originating the user input. The output of the user recognition component 295 may be used to inform NLU processing, processing performed by a skill 290, as well as processing performed by other components of the system(s) 120 and/or other systems.

The system(s) 120 may include a topic recommendation storage 275. The topic recommendation storage 275 may store data representing previous topic recommendations output by the system(s) 120. Each previous topic recommendation may be associated with a user identifier in the topic recommendation storage 275, with the user identifier representing a user that originated a user input that resulted in the topic recommendation. Each previous topic recommendation may be associated with a timestamp representing when the topic recommendation was output by the system(s) 120. Each previous topic recommendation may be associated with data representing whether the corresponding user accepted the topic recommendation, denied the topic recommendation, did not respond to the topic recommendation, or responded to the topic recommendation but the system(s) 120 was unable to determine whether the user's response was a denial or acceptance.

The system(s) 120 may include a conversation recovery component 285 configured to perform conversation recovery as described herein. The conversation recovery component 285 may be implemented as a skill, or may be implemented as a different component of the system(s) 120 (as illustrated).

The conversation recovery component 285 may be invoked to execute when the system(s) 120 is not confident regarding which skill 290 should be invoked to perform an action responsive to the user input. The orchestrator component 230 may determine a confidence value of a highest scoring ASR hypothesis does not satisfy a threshold confidence value and/or may determine a highest scoring NLU hypothesis does not satisfy a threshold confidence value. The system(s) 120 may include a question and answer (Q&A) skill that executes at least partially in parallel with the NLU component 260 to determine whether a user input corresponds to a question to be answered by the Q&A skill. The orchestrator component 230 may determine the Q&A skill has indicated the user input is not a question to be answered by the Q&A skill, while also determining that the NLU results data represents the user input is a question to be answered by the Q&A skill. If the orchestrator component 230 makes any of the foregoing determinations, the orchestrator component 230 may be configured to send the NLU results data to the conversation recovery component 285, and not a skill 290.

In another example, the orchestrator component 230 may send NLU results data to a skill 290, but the skill 230 may determine it is not configured to perform an action responsive to the user input. An example includes a music skill being called to output a song but the music skill determining it does not have access to audio data corresponding to the song. The skill 230 may output an indicator representing such determination to the orchestrator component 230, and the orchestrator component 230 may then send the NLU results data to the conversation recovery component 285.

Figure 3:
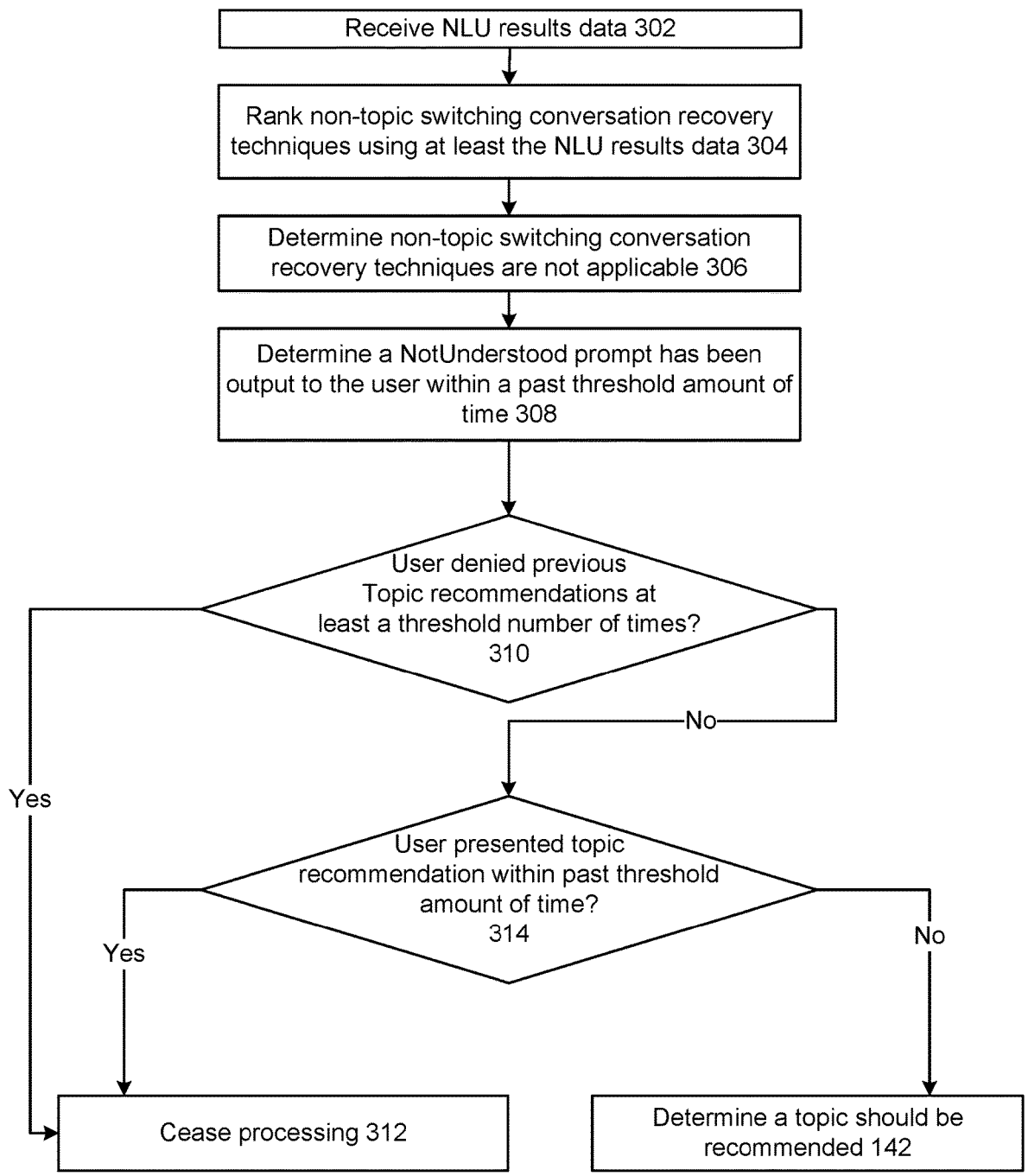
FIG. 3 is a process flow diagram illustrating how conversation recovery may be performed according to embodiments of the present disclosure.

The conversation recovery component 285 may be configured to recommend a topic when no other conversation recovery technique is applicable, and when the user has been provided with a "NotUnderstand" prompt or a "CannotPerformAction" prompt within a past threshold amount of time (e.g., within the past 30 seconds) (as illustrated in FIG. 3). A NotUnderstand prompt refers to a prompt that indicates to a user that the system(s) 120 was unable to understand the user's most recent user input. A NotUnderstood prompt may correspond to "I did not get that, can you please repeat" or the like. A CannotPerformAction prompt refers to a prompt that indicates to a user that the system(s) 120 was able to understand the user's most recent user input, but is unable to perform an action responsive to the user input. Such processing by the conversation recovery component 285 may prevent two or more NotUnderstood and/or CannotPerformAction prompts from being output to the user in response to back-to-back user inputs.

After receiving (302) NLU results data, the conversation recovery component 285 ranks (304) non-topic switching conversation recovery techniques using at least the NLU results data. As used herein, a non-topic switching technique is one that causes further user interaction in an attempt to perform an action responsive to the initial user input. The conversation recovery component 285 may be configured to perform various non-topic switching conversation recovery techniques including, but not limited to, asking the user to repeat the user input (e.g., when the ASR confidence is low); determining the most highly scored NLU hypothesis (that nonetheless does not satisfy the threshold confidence) and asking the user whether they want the system(s) 120 to perform an action responsive to the NLU hypothesis; etc. Each conversation recovery technique may be associated with specific criteria. Ranking of a conversation recovery technique may be determined based, at least in part, on whether all of the conversation recovery technique's criteria as satisfied. Determining whether criteria of a conversation recovery technique is satisfied may include analyzing the intent(s) and slot(s) in the NLU results data.

One non-topic switching conversation recovery technique may include invoking a skill configured to output content represented in a user input. A user input may only include an entity (e.g., "Alexa, Bruno Mars," "Alexa, Adele," or the like). Such a user input may correspond to a <Content>intent, representing the system(s) 120 should output content. Using the non-topic switching conversation recovery technique, the conversation recovery component 285 could determine a skill that may output content related to the entity in the user input. Using the user input "Alexa, Bruno Mars" as an example, the conversation recovery technique could be used to invoke a music skill to output one or more songs sung by Bruno Mars.

Another non-topic switching conversation recovery technique may include routing to a skill associated with an NLU hypothesis when the top scoring NLU hypothesis represents the user input is a question but the Q&A skill indicates it is not configured to execute with respect to the user input. In such situation, the conversation recovery technique may be used to determine a second highest ranked NLU hypothesis and, if the second highest ranked NLU hypothesis is associated with a confidence value that satisfies a threshold confidence value, causing a skill associated with the second highest ranked NLU hypothesis to execute with respect to the corresponding NLU hypothesis.

The conversation recovery component 285 may determine (306) that none of the non-topic switching conversation recovery techniques are applicable to the current situation. For example, the conversation recovery component 285 may determine that at least one criterion, of each non-topic switching conversation recovery technique, is not satisfied.

The conversation recovery component 285 may determine (308) a NotUnderstood prompt has been output to the user within a past threshold amount of time (e.g., within a past 30 seconds). For example, within the past threshold amount of time, the user may have provided a user input to the system(s) 120, which the system(s) 120 was unable to understand (e.g., due to low ASR confidence, low NLU confidence, etc.). In response, the system(s) 120 may cause the device 110 to output audio and/or display text indicating the system(s) 120 was unable to understand the user's input. The user may then provide the system(s) 120 with a subsequent user input, which is represented as the NLU results data received at step 302.

The conversation recovery component 285 may query the topic recommendation storage 275 for data representing whether a particular user identifier (representing the user that has provided the current user input) is associated with a NotUnderstood prompt that was output within the past threshold amount of time. The conversation recovery component 285 may base the determination of step 306 on data received in response to the query.

The conversation recovery component 285 may determine (310) whether the user has denied at least a threshold number of previous recommended topics, as users that have denied past recommendations may be considered inadequate candidates for future recommendations. The conversation recovery component 285 may determine a user identifier representing the user that provided the user input, and query the topic recommendation storage 275 for data representing when the user has denied (or not responded to) recommendations in the past. The conversation recovery component 285 may determine whether the denials (or absences of responses) amount to at least a threshold number of denials (or absences of responses) within a threshold amount of time. If the conversation recovery component 285 determines the user has denied (or not responded to) at least a threshold number of recommendations within a past threshold amount of time, the conversation recovery component 285 may cease (312) processing, which may result in a present dialog session being closed.

If the conversation recovery component 285 determines the user has not denied (or not responded to) at least a threshold number of recommendations within a past threshold amount of time, the conversation recovery component 285 may determine (314) whether the user has been recommended a topic within a past threshold amount of time (e.g., during the same calendar day). Such a determination may prevent the user from being overwhelmed with topic recommendations. The conversation recovery component 285 may determine a user identifier representing the user that provided the user input, and may query the topic recommendation storage 275 for data representing a most recent topic recommendation associated with the user identifier. If the conversation recovery component 285 determines the most recent topic recommendation occurred within the past threshold amount of time, the conversation recovery component 285 may cease (312) processing. Conversely, if the conversation recovery component 285 determines the most recent topic recommendation occurred previous to the past threshold amount of time, the conversation recovery component 285 may determine (142) a topic should be recommended. One skilled in the art will appreciate that steps 308 and 312 may be performed in various orders.

In at least some instances, the processing described with respect to step 312 may be performed on a type of topic basis. For example, the conversation recovery component 285 may determine a user identifier, representing a user that provided the user input, and may determine one or more types of topics that have been recommended to the user within the past threshold amount of time. The conversation recovery component 285 may eliminate those types of topics from being recommended to the user in response to the present user input. This prevents the user from being recommended the same type of topic in a particular amount of time, which could be an undesirable user experience.

Figure 4:
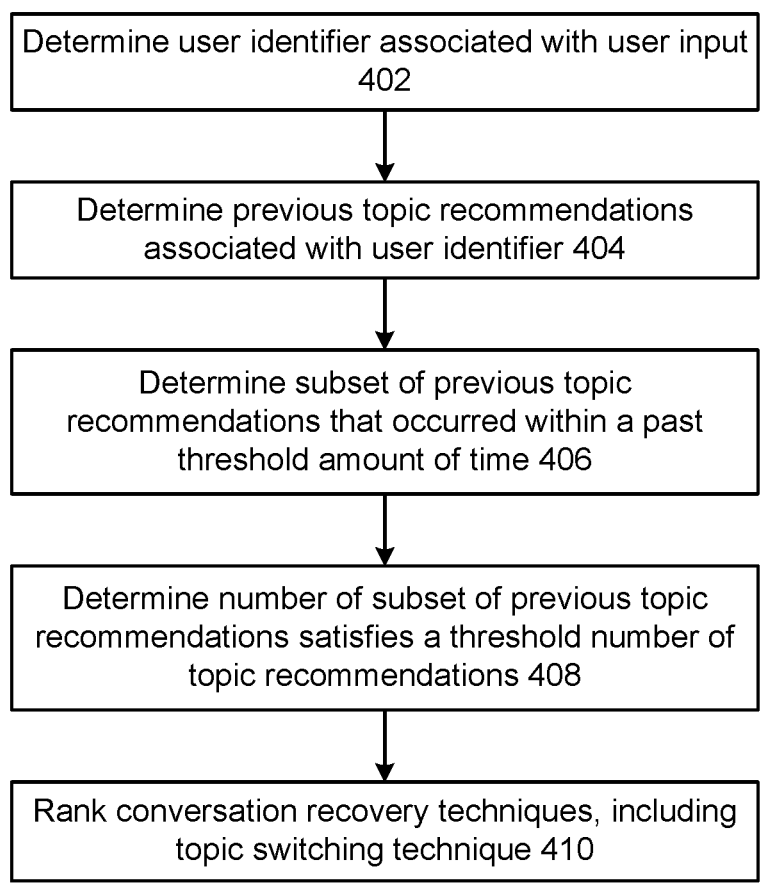
FIG. 4 is a process flow diagram illustrating how a conversation recovery component may determine to rank a topic switching technique along with other conversation recovery techniques according to embodiments of the present disclosure.

As described above, the conversation recovery component 285 may rank non-topic switching conversation recovery techniques and, only if none of the non-topic switching conversation recovery techniques are applicable, may determine the topic switching technique is applicable. In some implementations, the conversation recovery component 285 may rank all conversation recovery techniques, including the topic switching technique, when certain conditions are satisfied, such as if the user that provided the user input routinely accepts topic recommendations (as illustrated in FIG. 4).

The conversation recovery component 285 may determine (402) a user identifier associated with the user input (e.g., representing a user that originated the user input). The conversation recovery component 285 may determine (404) previous topic recommendations associated with the user identifier. The conversation recovery component 285 may determine (406) a subset of the previous topic recommendations that occurred within a past threshold of time, and may determine (408) the number of previous topic recommendations of the subset satisfies a threshold number of topic recommendations. After making such a determination, the conversation recovery component 285 may determine to rank (410) various conversation recovery techniques, including the topic switching technique. By performing such processing and ranking, the topic switching technique may be considered even if all criteria of at least one other conversation recovery technique is satisfied (e.g., if the topic switching technique is ranked higher than the other techniques).

Figure 5:
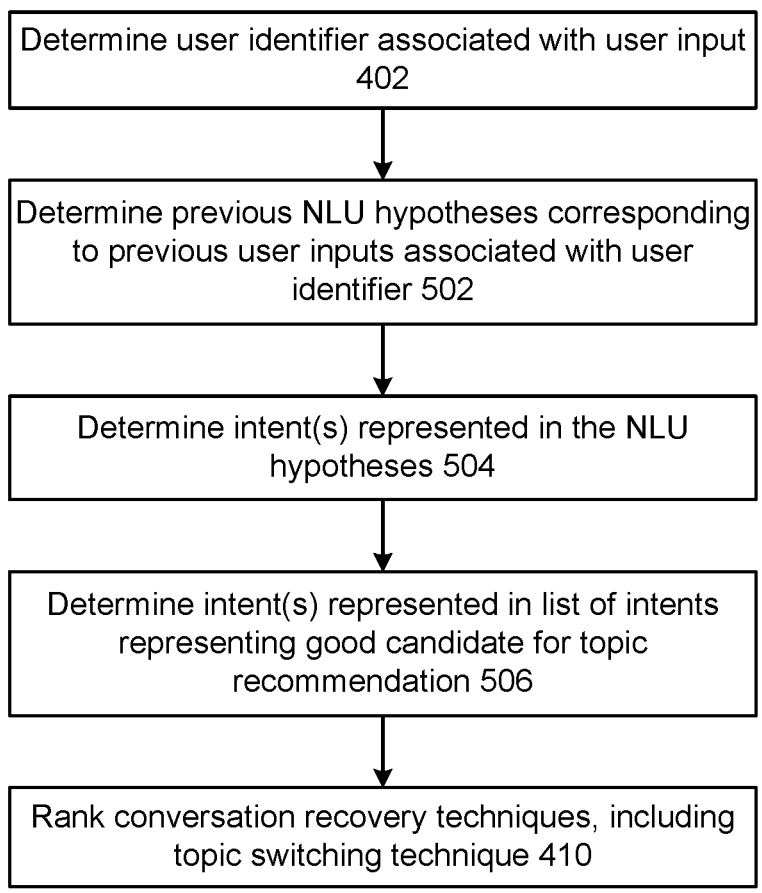
FIG. 5 is a process flow diagram illustrating how a conversation recovery component may determine to rank a topic switching technique along with other conversation recovery techniques according to embodiments of the present disclosure.

The conversation recovery component 285 may also or alternatively determine the topic switching technique should be ranked along with other conversation recovery techniques based on which intents the user's previous user inputs correspond to (as illustrated in FIG. 5). The conversation recovery component 285 may determine (402) a user identifier associated with the user input (e.g., representing a user that originated the user input). The conversation recovery component 285 may determine (502) previous NLU hypotheses associated with the user identifier, with the previous NLU hypothesis representing previous user inputs of the user. The conversation recovery component 285 may determine (504) one or more intents represented in the NLU hypotheses, and may determine (506) those one or more intents are represented in a list of intents representing the user is a good candidate for the topic switching technique (e.g., representing the user is likely to accept a recommended topic). Such intents may include a <TellJoke> intent (e.g., representing the user has previously asked the system(s) 120 to tell the user a joke), a <Phatic> intent (e.g., representing the user has previously input jokes to the system(s) 120), or some other intent that represents the user is an "easy going" or "outgoing" individual that may be willing to try new things (e.g., accept a recommended topic). After making such a determination, the conversation recovery component 285 may determine to rank (410) various conversation recovery techniques, including the topic switching technique.

Figure 6:
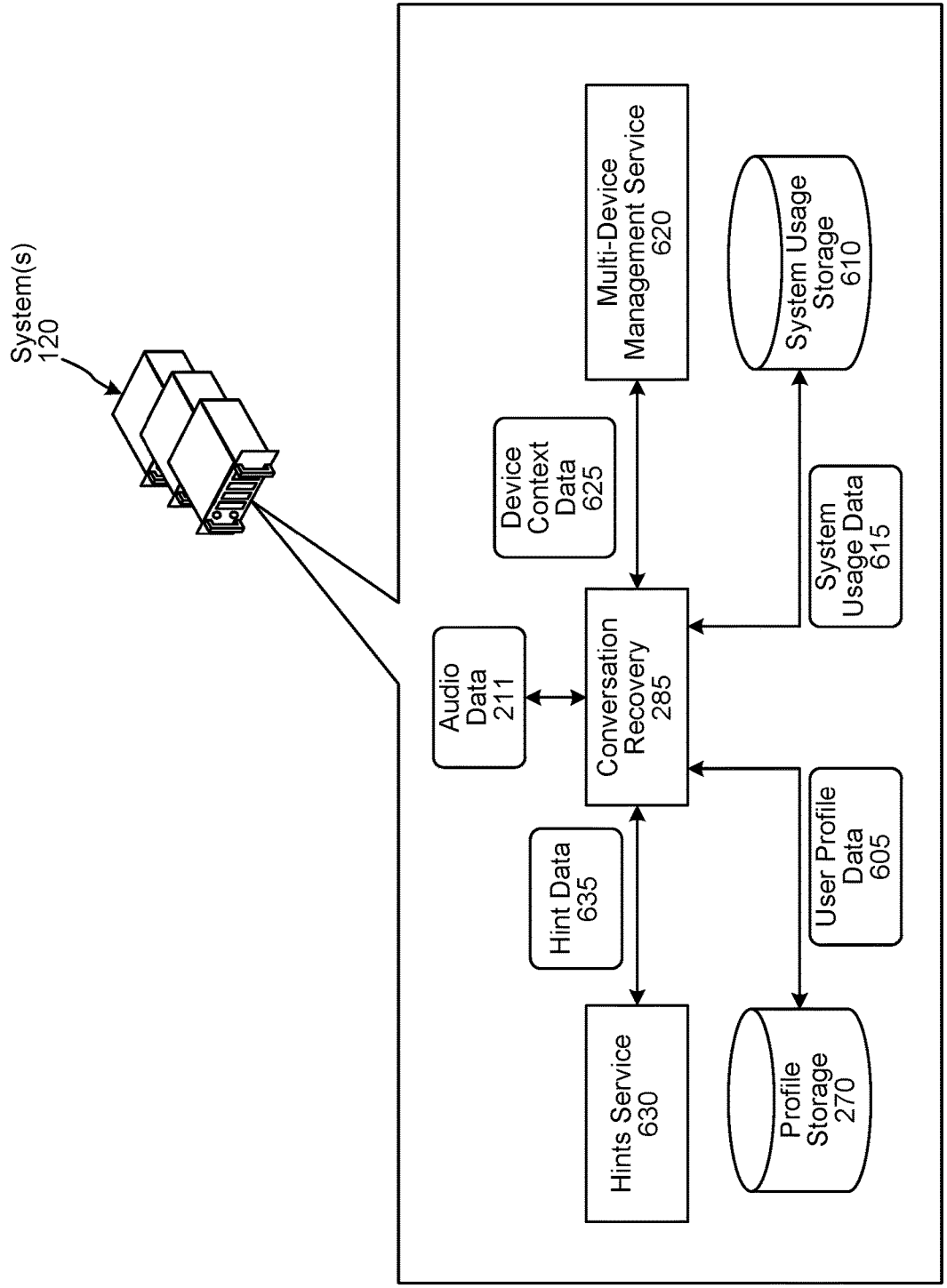
FIG. 6 is a conceptual diagram of the types of data a conversation recovery component may consider when determining a topic to recommend according to embodiments of the present disclosure.

After the conversation recovery component 285 determines a topic should be recommended to the user, the conversation recovery component 285 may determine which topic to recommend. As illustrated in FIG. 6, the conversation recovery component 285 may consider various data when determining which topic to recommend. The data represented in FIG. 6 is illustrative. One skilled in the art will appreciate that other types of contextual data may be considered by the conversation recovery component 285 when determining what topic to recommend as well as, in some instances, when determining whether to rank the topic switching technique along with other conversation recovery techniques.

The conversation recovery component 285 may consider user profile data 605 received from the profile storage 270 and/or system usage data 615 received from a system usage storage 610. The conversation recovery component 285 may query the profile storage 270 for user profile data 605 associated with the user identifier, representing the user that originated the user input. The conversation recovery component 285 may also or alternatively query the system usage storage 610 for system usage data 615 associated with the user identifier.

The conversation recovery component 285 may receive user profile data 605 representing whether the user is subscribed to a pay-for music service of the system(s) 102. The conversation recovery component 285 may also receive system usage data 615 representing whether the user has previously provided user inputs that resulted in the system(s) 120's pay-for music service being invoked. In an example, the conversation recovery component 285 may determine the pay-for music service should be recommended to the user if the user profile data 605 represents the user is subscribed to the music service but the system usage data 615 represents the user has not previously (or has not recently, for example within a past amount of time) provided a user input that caused the music service to be invoked.

The conversation recovery component 285 may receive user profile data 605 representing which skills of the system(s) 120 the user has enabled. When a user enables a skill, the user has provided the system(s) 120 with permission to invoke that skill to execute with respect to user inputs of that user. If a user has not enabled a skill, the system(s) 120 may be precluded from invoking the skill with respect to user inputs of the user.

The conversation recovery component 285 may receive user profile data 605 representing an age of the user. Such age information may indicate to the conversation recovery component 285 which type of skill or other topic to recommend. Such age information may also be used by the conversation recovery component 285 when ranking the topic switching technique along with other conversation recovery techniques, as users of different ages may be more likely to accept topic recommendations than other aged users.

The conversation recovery component 285 may receive user profile data 605 representing a geographic location of the user. Such geographic location may correspond to a continent, country, state, county, city, street address, etc. Such location information may indicate to the conversation recovery component 285 which type of skill or other topic to recommend. Such location information may also be used by the conversation recovery component 285 when ranking the topic switching technique along with other conversation recovery techniques, as users in different locations may be more likely to accept action recommendations than users in other locations.

The conversation recovery component 285 may receive the audio data 211, representing the user input. The conversation recovery component 285 may consider various aspects of the audio data 211, such as the shape of the utterance, the type of the utterance, the quality of the utterance, etc. when determining which topic to recommend. The shape and type of the utterance may map to the intent of the utterance. This intent may, in some instances, be used to determine which topic to recommend.

The conversation recovery component 285 may receive system usage data 615 representing processing performed for a current dialog session. For example, the system usage data 615 may be associated with a session identifier corresponding to the current and related previous user inputs. The conversation recovery component 285 may determine which topic to recommend based on, for example, how engaged the user was over the course of the dialog session. As an example, if the user was engaged (e.g., the user has provided the system(s) 120 with user inputs for at least a threshold amount of time, such as the past 5 minutes), the conversation recovery component 285 may recommend one topic, whereas the conversation recovery component 285 may recommend a different topic if the user was not engaged (e.g., the dialog session has been occurring for multiple minutes but most of the minutes the system(s) 120 was outputting music or other multimedia content). Such session information may also be used by the conversation recovery component 285 when ranking the topic switching technique along with other conversation recovery techniques, as more engaged users may be more likely to accept topic recommendations than less engaged users.

The conversation recovery component 285 may receive device context data 625 from a multi-device management service 620 of the system(s) 120. The user may have various devices registered to their user profile. For example, a user profile may represent a device identifier of each of the user's registered devices. The user may provide the user input to one of the user's device. The conversation recovery component 285 may determine a user identifier corresponding to the user, and may query the multi-device management service 620 for device context data 625 representing contexts of each of the user's registered devices. Such contexts may represent, for example, whether a device is display content on a display thereof, what content a device is displaying, whether a device is outputting audio, what audible content a device is outputting, etc. As an example, if the conversation recovery component 285 determines the device context data 625 represents a device is displaying content, the conversation recovery component 285 may determine to recommend a topic that does not require the display of content. As a further example, if the conversation recovery component 285 determines the device context data 625 represents a device is outputting audio, the conversation recovery component 285 may determine to recommend a topic that does not require the output of audio.

The conversation recovery component 285 may receive hint data 635 from a hints service 630 of the system(s) 120. The hints service 230 may generate hints data representing one or more topics that may provide the most value to the user's system/user experience. Hints may include actions such as customizing a news feed, customizing a user profile, subscribing to a service of the system(s) 120, as well as other actions. The hints service 630 may consider user profile data when generating one or more hints for a particular user identifier. The conversation recovery component 285 may query the hints service 630 for hints data 635 associated with the user identifier, representing the user that originated the user input.

The conversation recovery component 285 may implement one or more trained machine learning models. The machine learning model(s) may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, the machine learning processes themselves need to be trained. Training a machine learning component requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 7:
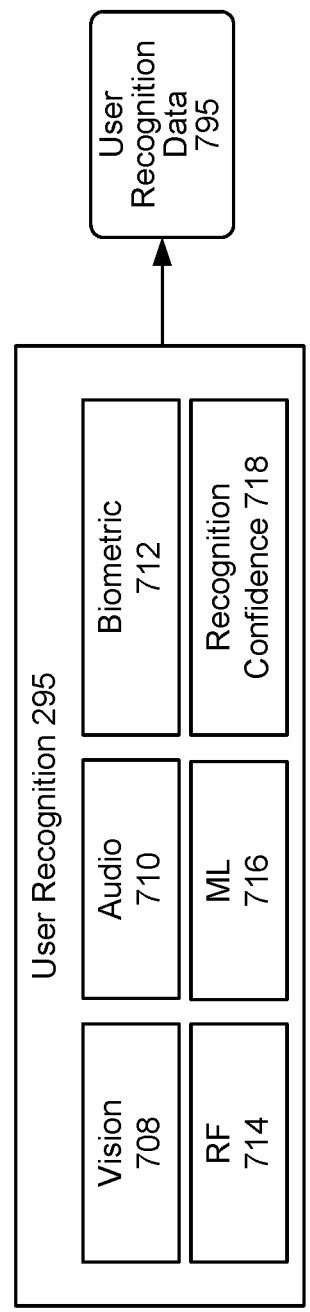
FIG. 7 is a conceptual diagram of an illustrative architecture in which sensor data is combined to recognize one or more users according to embodiments of the present disclosure.

As described herein, the system(s) 120 may include a user recognition component 295 that recognizes users that originate user inputs. As illustrated in FIG. 7, the user recognition component 295 may include one or more subcomponents including a vision component 708, an audio component 710, a biometric component 712, a radio frequency (RF) component 714, a machine learning (ML) component 716, and a recognition confidence component 718. In some instances, the user recognition component 295 may monitor data and determinations from one or more subcomponents to determine an identity of one or more users associated with data input to the system(s) 120. The user recognition component 295 may output user recognition data 795, which may include a user identifier associated with a user the user recognition component 295 believes originated a user input. The user recognition data 795 may be used to inform processes performed by the orchestrator component 230, the conversation recovery component 285, and/or other components of the system(s) 120.

The vision component 708 may receive data from one or more sensors capable of providing images (e.g., cameras) or sensors indicating motion (e.g., motion sensors). The vision component 708 can perform facial recognition or image analysis to determine an identity of a user and to associate that identity with a user identifier corresponding to the user. In some instances, when a user is facing a camera, the vision component 708 may perform facial recognition and identify the user with a high degree of confidence. In other instances, the vision component 708 may have a low degree of confidence of an identity of a user, and the user recognition component 295 may utilize determinations from additional components to determine an identity of a user. The vision component 708 can be used in conjunction with other components to determine an identity of a user. For example, the user recognition component 295 may use data from the vision component 708 with data from the audio component 710 to identify what user's face appears to be speaking at the same time audio is captured by a device 110 for purposes of identifying a user who spoke an input to the system(s) 120.

The system may include biometric sensors that transmit data to the biometric component 712. For example, the biometric component 712 may receive data corresponding to fingerprints, iris or retina scans, thermal scans, weights of users, a size of a user, pressure (e.g., within floor sensors), etc., and may determine a biometric profile corresponding to a user. The biometric component 712 may distinguish between a user and sound from a television, for example. Thus, the biometric component 712 may incorporate biometric information into a confidence level for determining an identity of a user. Biometric information output by the biometric component 712 can be associated with specific user identifier (and corresponding user profile).

The RF component 714 may use RF localization to track devices that a user may carry or wear. For example, a user (and more particularly a user profile associated with the user) may be associated with a device. The device may emit RF signals (e.g., Wi-Fi, Bluetooth®, etc.). A device may detect the signal and indicate to the RF component 714 the strength of the signal (e.g., as a received signal strength indication (RSSI)). The RF component 714 may use the RSSI to determine an identity of a user (with an associated confidence level). In some instances, the RF component 714 may determine that a received RF signal is associated with a mobile device that is associated with a particular user identifier.

In some instances, a device 110 may include some RF or other detection processing capabilities so that a user who speaks an input may scan, tap, or otherwise acknowledge his/her personal device (such as a phone) to the device 110. In this manner, the user may "register" with the system(s) 120 for purposes of the system(s) 120 determining who spoke a particular input. Such a registration may occur prior to, during, or after speaking of an input.

The ML component 716 may track the behavior of various users as a factor in determining a confidence level of the identity of the user. By way of example, a user may adhere to a regular schedule such that the user is at a particular location during the day (e.g., at work or at school). In this example, the ML component 716 would factor in past behavior and/or trends into determining the identity of the user that provided input to the system(s) 120. Thus, the ML component 716 may use historical data and/or usage patterns over time to increase or decrease a confidence level of an identity of a user.

In some instances, the recognition confidence component 718 receives determinations from the various components 708, 710, 712, 714, and/or 716, and may determine a final confidence level associated with the identity of a user. In some instances, the confidence level may determine whether an action is performed. For example, if a user input includes a request to unlock a door, a confidence level may need to be above a threshold that may be higher than a threshold confidence level needed to perform a user request associated with playing a playlist or sending a message. The confidence level or other score data may be included in the user recognition data 795.

The audio component 710 may receive data from one or more sensors capable of providing an audio signal (e.g., one or more microphones) to facilitate recognition of a user. The audio component 710 may perform audio recognition on an audio signal to determine an identity of the user and associated user identifier. In some instances, aspects of the system(s) 120 may be configured at a computing device (e.g., a local server). Thus, in some instances, the audio component 710 operating on a computing device may analyze all sound to facilitate recognition of a user. In some instances, the audio component 710 may perform voice recognition to determine an identity of a user.

The audio component 710 may also perform user recognition based on audio data 211 input into the system(s) 120 for speech processing. The audio component 710 may determine scores indicating whether speech in the audio data 211 originated from particular users. For example, a first score may indicate a likelihood that speech in the audio data 211 originated from a first user associated with a first user identifier, a second score may indicate a likelihood that speech in the audio data 211 originated from a second user associated with a second user identifier, etc. The audio component 710 may perform user recognition by comparing speech characteristics, representing speech in the audio data 211, to stored speech characteristics of users (associated with the device 110 that captured the spoken user input).

Figure 8:
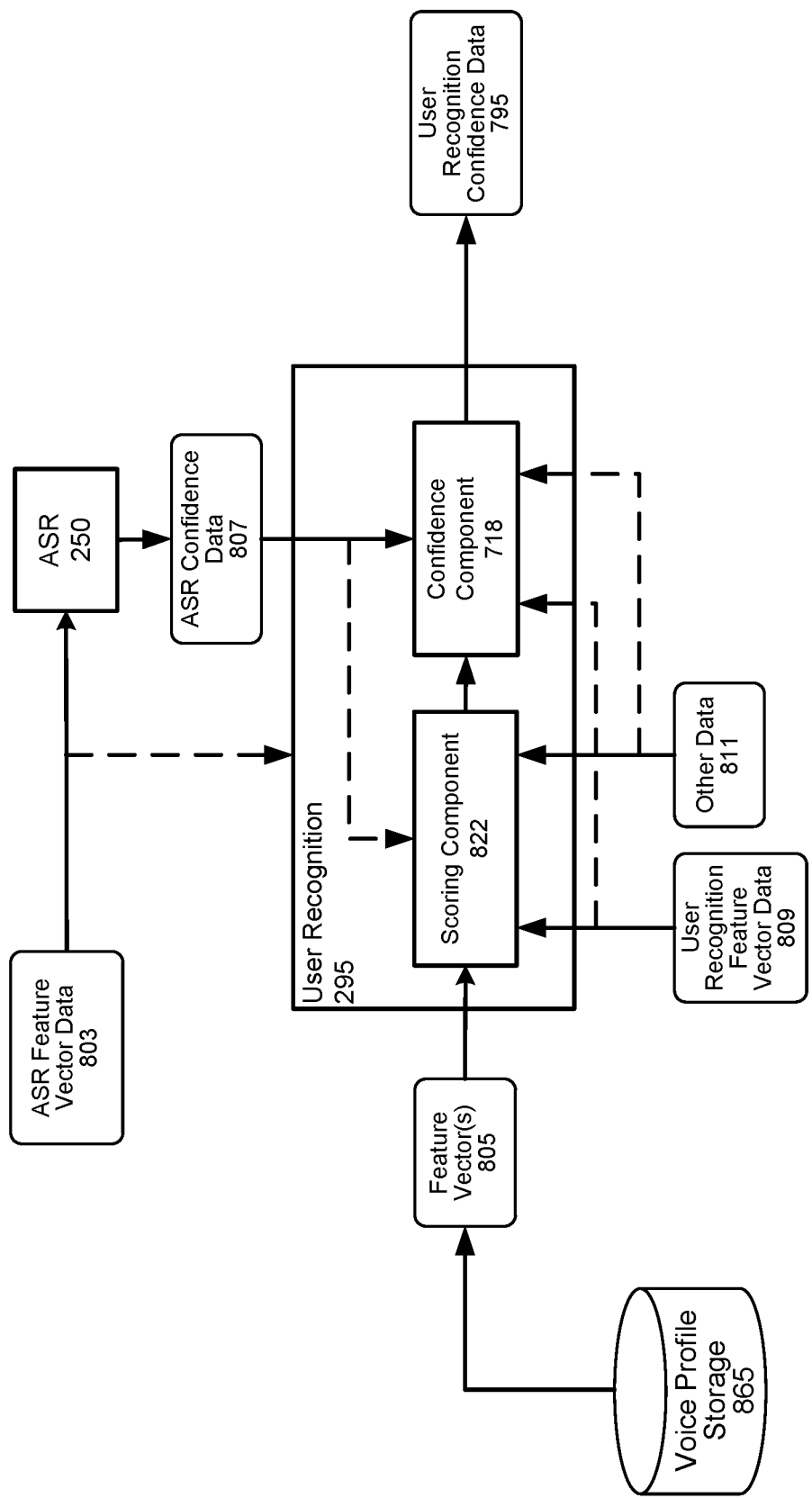
FIG. 8 is a system flow diagram illustrating user recognition according to embodiments of the present disclosure.

FIG. 8 illustrates how user recognition may be performed by the user recognition component 295. The ASR component 250 performs ASR on ASR feature vector data 803. ASR confidence data 807 is passed to the user recognition component 295.

The user recognition component 295 performs user recognition using various data including user recognition feature vector data 809 representing speech characteristics of the audio data 211, feature vectors 805 representing known voice profiles, the ASR confidence data 807, and other data 809. The user recognition component 295 may output user recognition confidence data 795 that reflects a confidence that speech was spoken by one or more particular users. The user recognition confidence data 795 may include one or more user identifiers. Each user identifier in the user recognition confidence data 795 may be associated with a respective confidence value, representing a likelihood that the speech corresponds to the user identifier. A confidence value may be a numeric or binned value.

The feature vector(s) 805, input to the user recognition component 295, may correspond to one or more voice profiles (stored in voice profile storage 865). The user recognition component 295 may compare the feature vector(s) 805 against the user recognition feature vector 809, representing speech in the audio data 211, to determine whether the user recognition feature vector 809 corresponds to one or more of the feature vectors 805 corresponding to known voice profiles.

Each feature vector 805 may be the same size as the user recognition feature vector 809.

To perform user recognition, the user recognition component 295 may determine the device 110 from which the audio data 211 originated. For example, the audio data 211 may be associated with metadata including a device identifier representing the device 110. Either the device 110 or the system(s) 120 may generate the metadata. The system(s) 120 may determine a group profile identifier associated with the device identifier, may determine user profile identifiers associated with the group profile identifier, and may include the group profile identifier and/or the user profile identifiers in the metadata. The system(s) 120 may associate the metadata with the user recognition feature vector 809 produced from the audio data 211. The user recognition component 295 may send a signal to the voice profile feature storage 865, with the signal requesting only feature vectors 805 associated with the device identifier, the group profile identifier, and/or the user profile identifiers represented in the metadata. This limits the universe of possible feature vectors 805 the user recognition component 295 may consider and, thus, decreases the amount of time to perform user recognition by decreasing the amount of feature vectors 805 needed to be processed. Alternatively, the user recognition component 295 may access all (or some other subset of) feature vectors 805 available to the user recognition component 295. However, accessing all feature vectors 805 will likely increase the amount of time needed to perform user recognition based on the magnitude of feature vectors to be processed.

The user recognition component 295 may attempt to identify a user that spoke the speech represented in the audio data 211 by comparing the user recognition feature vector 809 to the received feature vector(s) 805. The user recognition component 295 may include a scoring component 822 that determines respective scores indicating whether the speech (represented by the user recognition feature vector 809) was spoken by one or more particular users (represented by the feature vector(s) 805). The user recognition component 295 may also include the confidence component 718 that determines an overall accuracy of user recognition operations (such as those of the scoring component 822) and/or an individual confidence value with respect to each user potentially identified by the scoring component 822. The output from the scoring component 822 may include a different confidence value for each received feature vector 805. For example, the output may include a first confidence value for a first feature vector, a second confidence value for a second feature vector, etc. Although illustrated as two separate components, the scoring component 822 and confidence component 718 may be combined into a single component or may be separated into more than two components.

The scoring component 822 and confidence component 718 may implement one or more trained machine learning models (such neural networks, classifiers, etc.) as known in the art. For example, the scoring component 822 may use probabilistic linear discriminant analysis (PLDA) techniques. PLDA scoring determines how likely it is that the user recognition feature vector 809 corresponds to a particular feature vector 805. The PLDA scoring may generate a confidence value for each feature vector 805 considered and may output a list of confidence values associated with respective user identifiers. The scoring component 822 may also use other techniques, such as GMMs, generative Bayesian models, or the like, to determine confidence values.

The confidence component 718 may input various data including information about the ASR confidence 807, speech length (e.g., number of frames or time of the user input), audio condition/quality data (such as signal-to-interference data or other metric data), fingerprint data, image data, or other factors to consider how confident the user recognition component 295 is with regard to the confidence values linking users to the user input. The confidence component 718 may also consider the confidence values and associated user identifiers output by the scoring component 822. Thus, the confidence component 718 may determine that a lower ASR confidence 807, or poor audio quality, or other factors, may result in a lower confidence of the user recognition component 295. Whereas a higher ASR confidence 807, or better audio quality, or other factors, may result in a higher confidence of the user recognition component 295. Precise determination of the confidence may depend on configuration and training of the confidence component 718 and the models implemented thereby. The confidence component 718 may operate using a number of different machine learning models/techniques such as GMM, neural networks, etc. For example, the confidence component 718 may be a classifier configured to map a score output by the scoring component 822 to a confidence value.

The user recognition component 295 may output user recognition confidence data 795 specific to a single user identifier (or more than one user identifier in the form of an N-best list). The user recognition confidence data 795 may include numeric confidence values (e.g., 0.0-1.0, 0-1000, or whatever scale the system is configured to operate). Thus the user recognition confidence data 795 may output an N-best list of potential users with numeric confidence values (e.g., user identifier 123-0.2, user identifier 234-0.8). Alternatively or in addition, the user recognition confidence data 795 may include binned confidence values. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." Thus, the user recognition component 295 may output an N-best list of potential users with binned confidence values (e.g., user identifier 123-low, user profile identifier 234-high). Combined binned and numeric confidence value outputs are also possible. Rather than a list of user identifiers and their respective confidence values, the user recognition confidence data 795 may only include information related to the top scoring user identifier as determined by the user recognition component 295. The user recognition component 295 may also output an overall confidence value that the individual confidence values are correct, where the overall confidence value indicates how confident the user recognition component 295 is in the output results. The overall confidence value may be determined by the confidence component 718.

The confidence component 718 may determine differences between individual confidence values when determining the user recognition confidence data 795. For example, if a difference between a first confidence value and a second confidence value is large, and the first confidence value is above a threshold confidence value, then the user recognition component 295 is able to recognize a first user (associated with the feature vector 805 associated with the first confidence value) as the user that spoke the user input with a much higher confidence than if the difference between the confidence values were smaller.

The user recognition component 295 may perform thresholding to avoid incorrect user recognition results being output. For example, the user recognition component 295 may compare a confidence value output by the confidence component 718 to a threshold confidence value. If the confidence value does not satisfy (e.g., does not meet or exceed) the threshold confidence, the user recognition component 295 may not output user recognition confidence data 795, or may only include in that data 795 an indication that a user could not be recognized. Further, the user recognition component 295 may not output user recognition confidence data 795 until enough user recognition feature vector data 809 is accumulated and processed to verify a user above a threshold confidence. Thus, the user recognition component 295 may wait until a threshold quantity of the audio data 211 has been processed before outputting user recognition confidence data 795. The quantity of received audio data 211 may also be considered by the confidence component 718.

The user recognition component 295 may be defaulted to output binned (e.g., low, medium, high) user recognition confidence values. However, such may be problematic in certain situations. For example, if the user recognition component 295 computes a single binned confidence value with respect to multiple feature vectors 805, the system(s) 120 may not be able to effectively determine which user originated the user input. In this situation, the user recognition component 295 may be configured to override its default setting and output numeric confidence values. This enables the system(s) 120 to determine a user, associated with the highest numeric confidence value, originated the user input.

The user recognition component 295 may use other data 811 to inform user recognition processing. Thus, a trained model or other component of the user recognition component 295 may be trained to take other data 811 as an input feature when performing recognition. Other data 811 may include a wide variety of data types depending on system configuration and may be made available from other sensors, devices, or storage. The other data 811 may include a time of day at which the audio data 211 was generated by the device 110 or received from the device 110, a day of a week in which the audio data 211 was generated by the device 110 or received from the device 110, etc.

The other data 811 may include image data or video data. For example, facial recognition may be performed on image data or video data received from a device 110 from which the audio data 211 was received (or another device). Facial recognition may be performed by the user recognition component 295, or another component of the system(s) 120. The output of facial recognition processing may be used by the user recognition component 295. That is, facial recognition output data may be used in conjunction with the comparison of the user recognition feature vector 809 and one or more feature vectors 805 to perform more accurate user recognition.

The other data 811 may include location data of a device 110. The location data may be specific to a building within which the device 110 is located. For example, if the device 110 is located in user A's bedroom, such location may increase a user recognition confidence value associated with user A and/or decrease a user recognition confidence value associated with user B.

The other data 811 may include data indicating a device type. Different types of devices may include, for example, a smart watch, a smart phone, a tablet computer, and a vehicle. The device 110's type may be indicated in a profile associated with the device 110. For example, if the device 110 from which the audio data 211 was received is a smart watch or vehicle belonging to a user A, the fact that the device 110 belongs to user A may increase a user recognition confidence value associated with user A and/or decrease a user recognition confidence value associated with user B.

The other data 811 may include geographic coordinate data associated with a device 110. For example, a group profile associated with a vehicle may indicate multiple users (e.g., user A and user B). The vehicle may include a global positioning system (GPS) indicating latitude and longitude coordinates of the vehicle when the audio data 211 is generated by the vehicle. As such, if the vehicle is located at a coordinate corresponding to a work location/building of user A, such may increase a user recognition confidence value associated with user A and/or decrease user recognition confidence values of all other users indicated in a group profile associated with the vehicle. Global coordinates and associated locations (e.g., work, home, etc.) may be indicated in a profile associated with the device 110. The global coordinates and associated locations may be associated with one or more respective user identifiers (and corresponding user profiles).

The other data 811 may include addition data representing activity of a particular user that may be useful in performing user recognition. For example, if a user has recently entered a code to disable a home security alarm, and the audio data 211 was received from a device 110 represented in a group profile associated with the home, signals from the home security alarm about the disabling user, time of disabling, etc. may be reflected in the other data 811 and considered by the user recognition component 295. If a mobile device (such as a smart phone, Tile, dongle, or other device) known to be associated with a particular user is detected proximate to (for example physically close to, connected to the same Wi-Fi network as, or otherwise nearby) the device 110, this may be reflected in the other data 811 and considered by the user recognition component 295.

Depending on system configuration, the other data 811 may be configured to be included in the user recognition feature vector data 809 so that all the data relating to the situation of a device 110 is included in a single feature vector. Alternatively, the other data 811 may be reflected in one or more different data structures to be processed by the scoring component 822.

Figure 9:
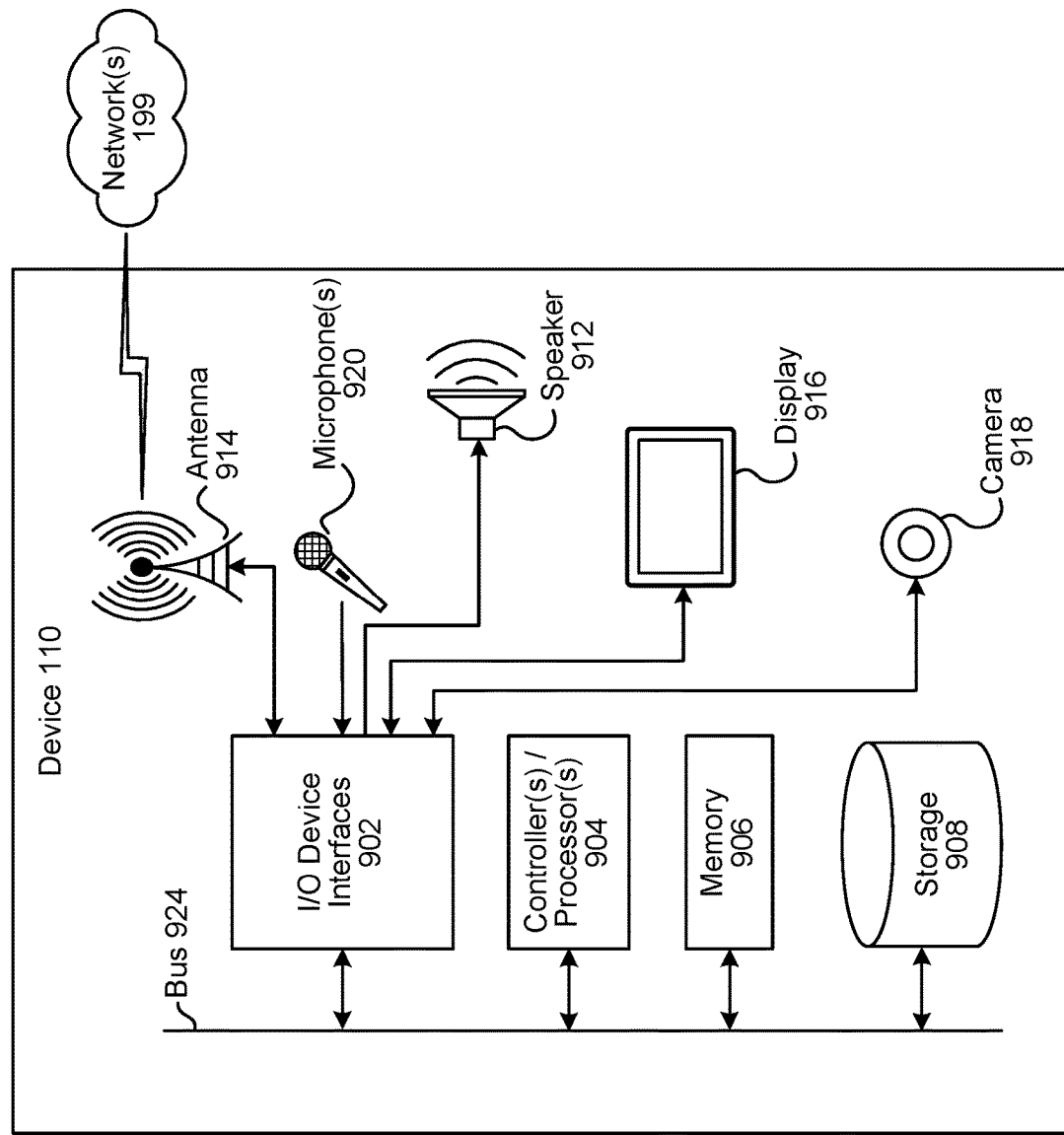
FIG. 9 is a block diagram conceptually illustrating example components of a device according to embodiments of the present disclosure.
Figure 10:
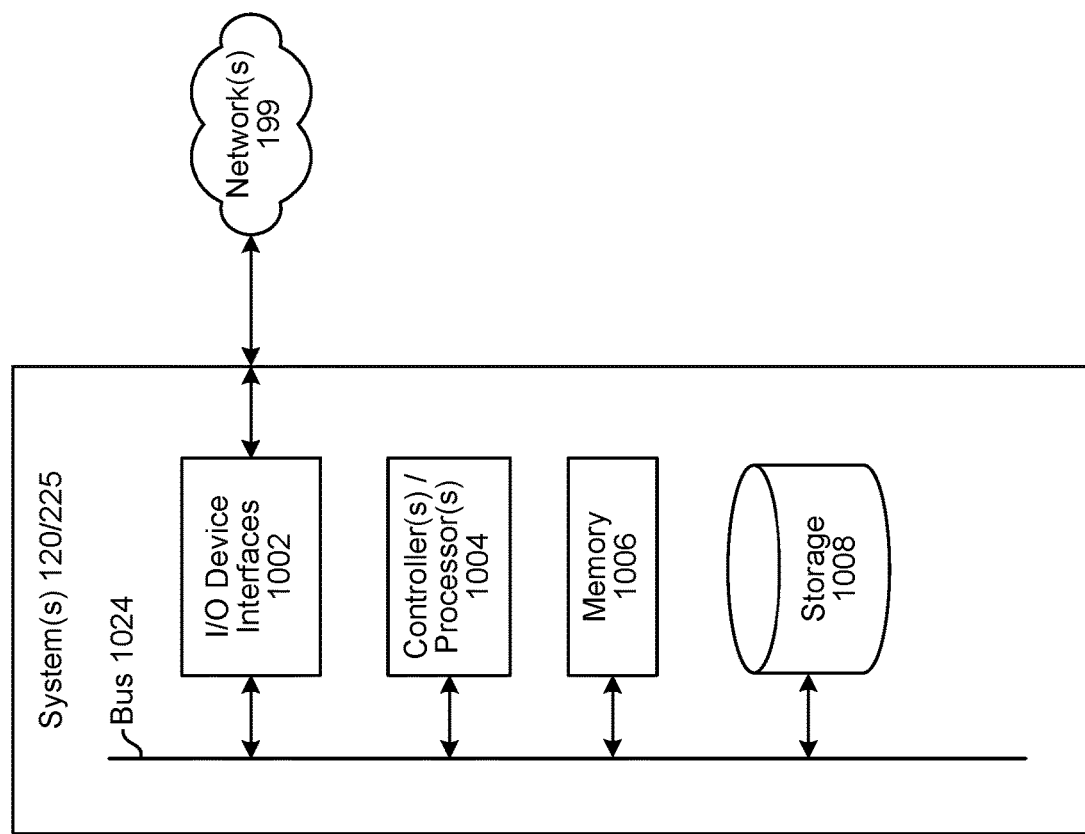
FIG. 10 is a block diagram conceptually illustrating example components of a system according to embodiments of the present disclosure.

FIG. 9 is a block diagram conceptually illustrating a device 110 that may be used with the system. FIG. 10 is a block diagram conceptually illustrating example components of a remote device, such as the system(s) 120, which may assist with ASR processing, NLU processing, etc., and the skill system(s) 225. A system (120/225) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/225) may be included in the overall system of the present disclosure, such as one or more systems 120 for performing ASR processing, one or more systems 120 for performing NLU processing, one or more skill systems 225 for performing actions responsive to user inputs, etc. In operation, each of these systems may include computer-readable and computer-executable instructions that reside on the respective device (120/225), as will be discussed further below.

Each of these devices (110/120/225) may include one or more controllers/processors (904/1004), which may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive memory (MRAM), and/or other types of memory. Each device (110/120/225) may also include a data storage component (908/1008) for storing data and controller/processor-executable instructions. Each data storage component (908/1008) may individually include one or more non-volatile storage types such as magnetic storage, optical storage, solid-state storage, etc. Each device (110/120/225) may also be connected to removable or external non-volatile memory and/or storage (such as a removable memory card, memory key drive, networked storage, etc.) through respective input/output device interfaces (902/1002).

Computer instructions for operating each device (110/120/225) and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device (110/120/225) includes input/output device interfaces (902/1002). A variety of components may be connected through the input/output device interfaces (902/1002), as will be discussed further below. Additionally, each device (110/120/225) may include an address/data bus (924/1024) for conveying data among components of the respective device. Each component within a device (110/120/225) may also be directly connected to other components in addition to (or instead of) being connected to other components across the bus (924/1024).

Referring to FIG. 9, the device 110 may include input/output device interfaces 902 that connect to a variety of components such as an audio output component such as a speaker 912, a wired headset or a wireless headset (not illustrated), or other component capable of outputting audio. The device 110 may also include an audio capture component. The audio capture component may be, for example, a microphone 920 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 916 for displaying content. The device 110 may further include a camera 918.

Via antenna(s) 914, the input/output device interfaces 902 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (902/1002) may also include communication components that allow data to be exchanged between devices such as different physical servers in a collection of servers or other components.

The components of the device(s) 110, the system(s) 120, or the skill system(s) 225 may include their own dedicated processors, memory, and/or storage. Alternatively, one or more of the components of the device(s) 110, the system(s) 120, or the skill system(s) 225 may utilize the I/O interfaces (902/1002), processor(s) (904/1004), memory (906/1006), and/or storage (908/1008) of the device(s) 110 system(s) 120, or the skill system(s) 225, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system(s) 120, and the skill system(s) 225, as described herein, are illustrative, and may be located as a stand-alone device or may be included, in whole or in part, as a component of a larger device or system.

Figure 11:
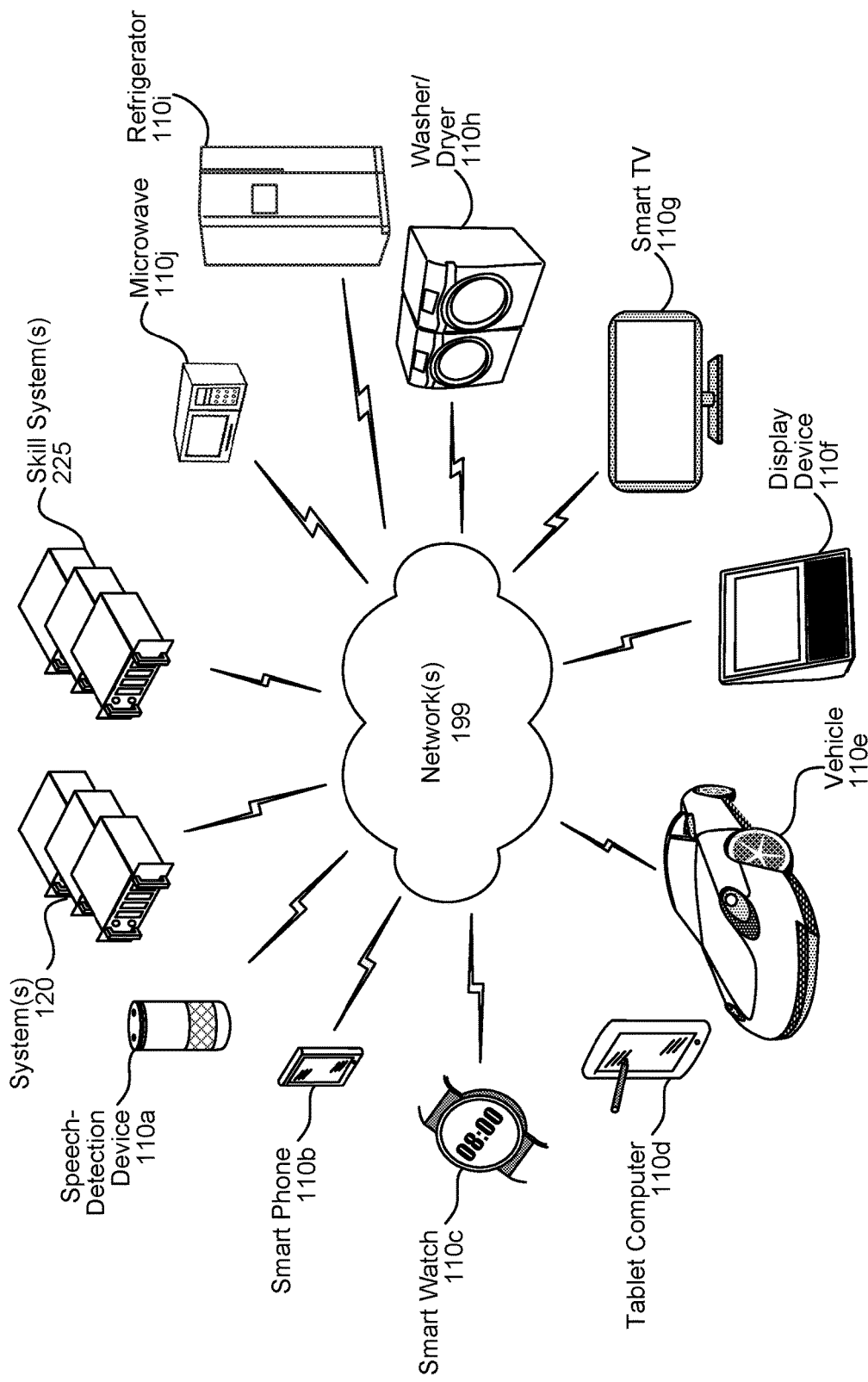
FIG. 11 illustrates an example of a computer network for use with the speech processing system.

As illustrated in FIG. 11, multiple devices (110a-110j, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a microwave 110j may be connected to the network(s) 199 through a wireless service provider, over a Wi-Fi or cellular network connection, or the like. Other devices are included as network-connected support devices, such as the system(s) 120, the skill system(s) 225, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more systems 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A method, comprising:
receiving, from a first device, first audio data representing a first user input;
performing automatic speech recognition (ASR) processing on the first audio data;
determining an error condition associated with the ASR processing;
identifying a plurality of techniques for removing the error condition, the plurality of techniques including: (i) causing a user to repeat the first user input and (ii) selecting a topic based at least in part on system usage data;
determining to select a first topic based at least in part on first system usage data;
generating second audio data representing the first topic; and
causing the first device to output audio corresponding to the second audio data.

2. The method of claim 1, further comprising:
causing the first device to output second audio requesting whether an action, related to the first topic, is to be performed;
receiving, from the first device, fourth audio data representing a second user input;
performing speech processing on the fourth audio data to determine the second user input represents the action is to be performed;
determining a second skill configured to perform the action; and
causing the second skill to perform the action.

3. The method of claim 1, further comprising:
receiving, from a first device, third audio data representing a second user input;
performing speech processing on the third audio data;

based at least in part on the speech processing, determining a second error condition;
determining a first ranking representing the user is to be requested to repeat the second user input;
determining a second ranking representing the user is to be requested to clarify a skill configured to execute with respect to the second user input;
determining a third ranking representing a second topic is to be recommended to the user;
determining the third ranking is greater than the first ranking and the second ranking;
based at least in part on the third ranking being greater than the first ranking and the second ranking, generating fourth audio data representing the second topic; and
causing the first device to output second audio corresponding to the fourth audio data.

4. The method of claim 1, further comprising:
receiving, from the first device, third audio data representing a second user input;
performing speech processing on the third audio data;
based at least in part on the speech processing, determining a second error condition;
generating fourth audio data representing the second user input cannot be correctly responded to;
causing the first device to output second audio corresponding to the fourth audio data; and
based at least in part on causing the first device to output the second audio, selecting the first topic.

5. A method, comprising:
receiving, from a first device, first data representing a first user input;
determining an error condition in response to the first user input;
identifying a plurality of techniques for recovering from the error condition through a conversation with a user, the plurality of techniques including: (i) causing the user to repeat the first user input and (ii) selecting a topic based at least in part on at least one of system usage data or user profile data;
generating second data representing a first topic selected based on at least one of first system usage data or first user profile data; and
sending the second data to the first device.

6. The method of claim 5, further comprising:
receiving, from the first device, third data representing a second user input;
determining the third data represents information, corresponding to the topic, is to be output;
generating fourth data corresponding to the information; and
sending the fourth data to the first device.

7. The method of claim 6, further comprising:
causing the first device to output content requesting whether an action, related to the topic, is to be performed;
receiving, from the first device, fifth data representing a third user input;
determining the fifth data represents the action is to be performed;
determining a skill configured to perform the action; and
causing the skill to execute.

8. The method of claim 5, further comprising:
receiving, from the first device, third data representing a second user input;
determining a second error condition in response to the second user input;
determining a third ranking representing the user is to be requested to repeat the second user input;
determining the third ranking fails to satisfy a threshold ranking;
based at least in part on determining the third ranking fails to satisfy the threshold ranking, determining a second topic is to be recommended to the user;
generating fourth data representing the second topic; and
sending the fourth data to the first device.

9. The method of claim 5, further comprising:
determining a user identifier associated with the first data;
determining, associated with the user identifier, a first number corresponding to previous information being output to the user, the previous information corresponding to at least one topic;
determining a second number corresponding to a subset of the previous information that was output to the user within a past threshold amount of time;
determining the second number satisfies a threshold number; and
based at least in part on the second number satisfying the threshold number, generating the second data.

10. The method of claim 5, further comprising:
determining a user identifier associated with the first data;
determining an intent indicator representing a previous user input associated with the user identifier;
determining the intent indicator is represented in a list of intent indicators; and
based at least in part on the intent indicator being represented in the list, generating the second data.

11. The method of claim 5, further comprising:
determining a user identifier associated with the first data;
determining, associated with the user identifier, a number corresponding to previous instances when the user has prevented output of previous information corresponding to at least one topic;
determining the number fails to satisfy a threshold number of previous instances; and
based at least in part on the number failing to satisfy the threshold number, determining the topic.

12. The method of claim 5, further comprising:
determining a user identifier associated with the first data;
determining, associated with the user identifier, a most recent instance when second information, related to a second topic, was output;
determining the most recent instance is outside of a past threshold amount of time; and
based on the most recent instance being outside of the past threshold amount of time, determining the topic.

13. The method of claim 5, further comprising:
performing automatic speech recognition (ASR) processing on the first data to generate an ASR confidence value;
determining the ASR confidence value fails to satisfy a threshold ASR confidence value; and
based at least in part on the determining the ASR confidence value fails to satisfy the threshold ASR confidence value, determining an error message is to be output.

14. The method of claim 5, further comprising:
performing automatic speech recognition (ASR) processing on the first data to generate text data;
performing natural language understanding (NLU) processing on the text data to generate a NLU confidence value;
determining the NLU confidence value fails to satisfy a threshold NLU confidence value; and based at least in part on the determining the NLU confidence value fails to satisfy the threshold NLU confidence value, determining an error message is to be output.

15. A system, comprising:
at least one processor; and
at least one memory comprising instructions that, when executed by the at least one processor, cause the system to:
receive, from a first device, first data representing a first user input;
determine an error condition in response to the first user input;
identify a plurality of techniques for recovering from the error condition through a conversation with a user, the plurality of techniques including: (i) causing the user to repeat the first user input and (ii) selecting a topic based at least in part on at least one of system usage data or user profile data;
generate second data representing a first topic selected based on at least one of first system usage data or first user profile data; and
send the second data to the first device.

16. The system of claim 15, wherein the at least one memory further comprises instructions that, when executed by the at least one processor, further cause the system to:
receive, from the first device, third data representing a second user input;
determine the third data represents information, corresponding to the topic, is to be output;
generate fourth data corresponding to the information; and
send the fourth data to the first device.

17. The system of claim 15, wherein the at least one memory further comprises instructions that, when executed by the at least one processor, further cause the system to:
cause the first device to output content requesting whether an action, related to the topic, is to be performed;
receive, from the first device, fifth data representing a third user input;
determine the fifth data represents the action is to be performed;
determine a skill configured to perform the action; and
cause the skill to execute.

18. The system of claim 15, wherein the at least one memory further comprises instructions that, when executed by the at least one processor, further cause the system to:
receive, from the first device, third data representing a second user input;
determine a second error condition in response to the second user input ;
determine a third ranking representing the user is to be requested to repeat the second user input;
determine the third ranking fails to satisfy a threshold ranking;
based at least in part on determining the third ranking fails to satisfy the threshold ranking, determine a second topic is to be recommended to the user;
generate fourth data representing the second topic; and
send the fourth data to the first device.

19. The system of claim 15, wherein the at least one memory further comprises instructions that, when executed by the at least one processor, further cause the system to:
determine a user identifier associated with the first data;
determine, associated with the user identifier, a first number corresponding to previous information being output to the user, the previous information corresponding to at least one topic;
determine a second number corresponding to a subset of the previous information that was output to the user within a past threshold amount of time;
determine the second number satisfies a threshold number; and
based at least in part on the second number satisfying the threshold number, generate the second data.

20. The system of claim 15, wherein the at least one memory further comprises instructions that, when executed by the at least one processor, further cause the system to:
determine a user identifier associated with the first data;
determine an intent indicator representing a previous user input associated with the user identifier;
determine the intent indicator is represented in a list of intent indicators; and
based at least in part on the intent indicator being represented in the list, generate the second data.

* * * * *